US009881406B2

(12) United States Patent
Nakamura

(10) Patent No.: US 9,881,406 B2
(45) Date of Patent: Jan. 30, 2018

(54) IMAGE PROCESSING USING DETECTION SIGNAL REPRESENTS A MOVEMENT SPEED OF THE IMAGE PROCESSING TERMINAL, THE NUMBER OF MOVEMENTS OF THE IMAGE PROCESSING TERMINAL, AND AN ACCELERATION OF THE IMAGE PROCESSING TERMINAL

(71) Applicant: FAST RETAILING CO., LTD., Yamaguchi-shi, Yamaguchi (JP)

(72) Inventor: Yugo Nakamura, Tokyo (JP)

(73) Assignee: Fast Retailing Co., Ltd., Yamaguchi-shi, Yamaguchi (JP)

( * ) Notice: Subject to any disclaimer, the term of this patent is extended or adjusted under 35 U.S.C. 154(b) by 0 days.

(21) Appl. No.: 14/763,671

(22) PCT Filed: May 30, 2014

(86) PCT No.: PCT/JP2014/064459
§ 371 (c)(1),
(2) Date: Jul. 27, 2015

(87) PCT Pub. No.: WO2015/181964
PCT Pub. Date: Dec. 3, 2015

(65) Prior Publication Data
US 2017/0109911 A1    Apr. 20, 2017

(51) Int. Cl.
*G09G 5/00*    (2006.01)
*G06T 11/60*    (2006.01)
(Continued)

(52) U.S. Cl.
CPC ............ *G06T 11/60* (2013.01); *G06T 3/4038* (2013.01); *G06T 11/203* (2013.01); *G06T 11/40* (2013.01); *G06T 2207/20221* (2013.01)

(58) Field of Classification Search
CPC .......... G06T 11/40; G06T 11/60; G06T 11/203
(Continued)

(56) References Cited

U.S. PATENT DOCUMENTS 5,182,548 A *    1/1993    Haeberli ............... G06T 11/001
                                                              345/639
6,208,355 B1 *    3/2001    Schuster ............... G06T 11/001
                                                              345/442
(Continued)

FOREIGN PATENT DOCUMENTS

JP        2001-273512        10/2001
JP        2001-344484        12/2001
(Continued)

OTHER PUBLICATIONS

Akira Iizuka: "[Taiken Repo] UT mel de Original T-Shirt o Churnon shitara Futsuka de todolta", ("Experience report] UT me arrived in two days Once you order the original T-shirt"), Shopping Tribe, May 22, 2014, 28 pages.
(Continued)

*Primary Examiner* — Jin-Cheng Wang
(74) *Attorney, Agent, or Firm* — Finnegan, Henderson, Farabow, Garrett & Dunner, LLP

(57) ABSTRACT

An image processing program for causing a computer to execute: a procedure for obtaining a first image; a procedure for obtaining a second image; a procedure for changing at least a part of the second image in accordance with a signal; and a procedure for processing the first image using the changed second image. The second image is at least one of a handwritten image, a letter image, and a selected image, and the signal is used in a process which splashes the second image in a procedure which changes at least a part of the second image.

16 Claims, 22 Drawing Sheets

(51) Int. Cl.
*G06T 3/40* (2006.01)
*G06T 11/40* (2006.01)
*G06T 11/20* (2006.01)

(58) Field of Classification Search
USPC .................. 345/594, 596, 589, 600, 619
See application file for complete search history.

(56) References Cited

U.S. PATENT DOCUMENTS

| | | | | |
|---|---|---|---|---|
| 6,373,490 | B1* | 4/2002 | Bendiksen | G06T 11/001 |
| | | | | 345/441 |
| 8,866,841 | B1* | 10/2014 | Distler | G06T 11/60 |
| | | | | 345/619 |
| 9,104,298 | B1* | 8/2015 | Varley | G06F 3/04842 |
| 2007/0268304 | A1* | 11/2007 | Hsu | G06T 11/001 |
| | | | | 345/592 |
| 2011/0037777 | A1* | 2/2011 | Lindahl | G06F 1/1626 |
| | | | | 345/619 |
| 2012/0050769 | A1 | 3/2012 | Houjou et al. | |
| 2013/0120436 | A1* | 5/2013 | Krishnaswamy | G06T 11/40 |
| | | | | 345/594 |
| 2013/0127898 | A1* | 5/2013 | DiVerdi | G06T 11/203 |
| | | | | 345/600 |
| 2013/0257807 | A1* | 10/2013 | Harris | G06F 3/0418 |
| | | | | 345/175 |

FOREIGN PATENT DOCUMENTS

| | | |
|---|---|---|
| JP | 2002-165002 | 6/2002 |
| JP | 2003-122803 | 4/2003 |
| JP | 2012-74019 | 4/2012 |

OTHER PUBLICATIONS

"Korekara Tishatsu Wa, "Erabu" Kara "Tsukur" Ga Kakkoi! Yunikuro UT Kara, Jibun Dake No 1-Mai O Tsukuru Shin Sabisuapuri "UT me!" Ga Tojo", ("T From UNIQLO "UT", a new service application to create a one of their own only appeared "UT me!""), Press Release, UNIQLO, May 19, 2014, 5 pages.
Supplementary European Search Report dated Sep. 7, 2016 from the European Patent Office in International Application No. 14879265. 8. 5 pages.
Notice of Reasons for Rejections from the Japanese Patent Office, dated Dec. 19, 2014, in corresponding JP 2014-546211.

* cited by examiner

FIG. 2

| IDENTIFICATION NUMBER | X COORDINATE | Y COORDINATE | HUE | CHROMA | SHAPE | LENGTH IN THE X DIRECTION | LENGTH IN THE Y DIRECTION | SENSITIVITY |
|---|---|---|---|---|---|---|---|---|
| 101 | 2 | 0 | BLACK | 1 | QUADRILATERAL | 1 | 1 | 1 |
| 102 | 1 | 1 | BLACK | 2 | QUADRILATERAL | 1 | 1 | 1 |
| 103 | 1 | 0 | BLACK | 1 | QUADRILATERAL | 1 | 1 | 2 |
| 104 | 0 | −1 | BLACK | 1 | QUADRILATERAL | 1 | 1 | 2 |
| 105 | −2 | −2 | BLACK | 2 | QUADRILATERAL | 1 | 1 | 2 |
| ... | ... | ... | ... | ... | ... | ... | ... | ... |

IMAGE PROCESSING USING DETECTION SIGNAL REPRESENTS A MOVEMENT SPEED OF THE IMAGE PROCESSING TERMINAL, THE NUMBER OF MOVEMENTS OF THE IMAGE PROCESSING TERMINAL, AND AN ACCELERATION OF THE IMAGE PROCESSING TERMINAL

TECHNICAL FIELD

Embodiments of the present invention relate to image processing programs, image processing terminals, image processing systems, and image processing methods.

BACKGROUND ART

Image processing terminals may process an image.

CITATION LIST

Patent Document

[Patent Document 1] JP2012-074019A

DISCLOSURE OF THE INVENTION

Technical Problem

However, there is a problem that the image processing terminals may not easily process the image.

A problem to be solved by the present invention is to provide image processing programs, image processing terminals, image processing systems, and image processing methods that may easily process the image.

Technical Solution

An image processing program according to an embodiment causes a computer to execute a procedure for obtaining a first image; a procedure for obtaining a second image; a procedure for changing at least a part of the second image in accordance with a signal; and a procedure for processing the first image using the changed second image.

An image processing terminal according to an embodiment obtains a first image, a second image, and a signal, changes at least a part of the second image in accordance with the signal, and processes the first image using the changed second image.

An image processing system according to an embodiment obtains an image processing terminal and a server apparatus. The image processing terminal obtains a first image, a second image, and a signal, changes at least a part of the second image in accordance with the signal, and processes the first image using the changed second image. The server apparatus transmits the processed first image to a different terminal and receives information from the different terminal.

An image processing method according to an embodiment is an image processing method in an image processing terminal, the method including the steps of: obtaining a first image; obtaining a second image; changing at least a part of the second image in accordance with a signal; and processing the first image using the changed second image.

BRIEF DESCRIPTION OF THE DRAWINGS

FIG. 2 is a diagram of management information on an additional image according to the embodiment;

MODE FOR CARRYING OUT THE INVENTION

An embodiment of the present invention is described with reference to the drawings.

Figure 1:
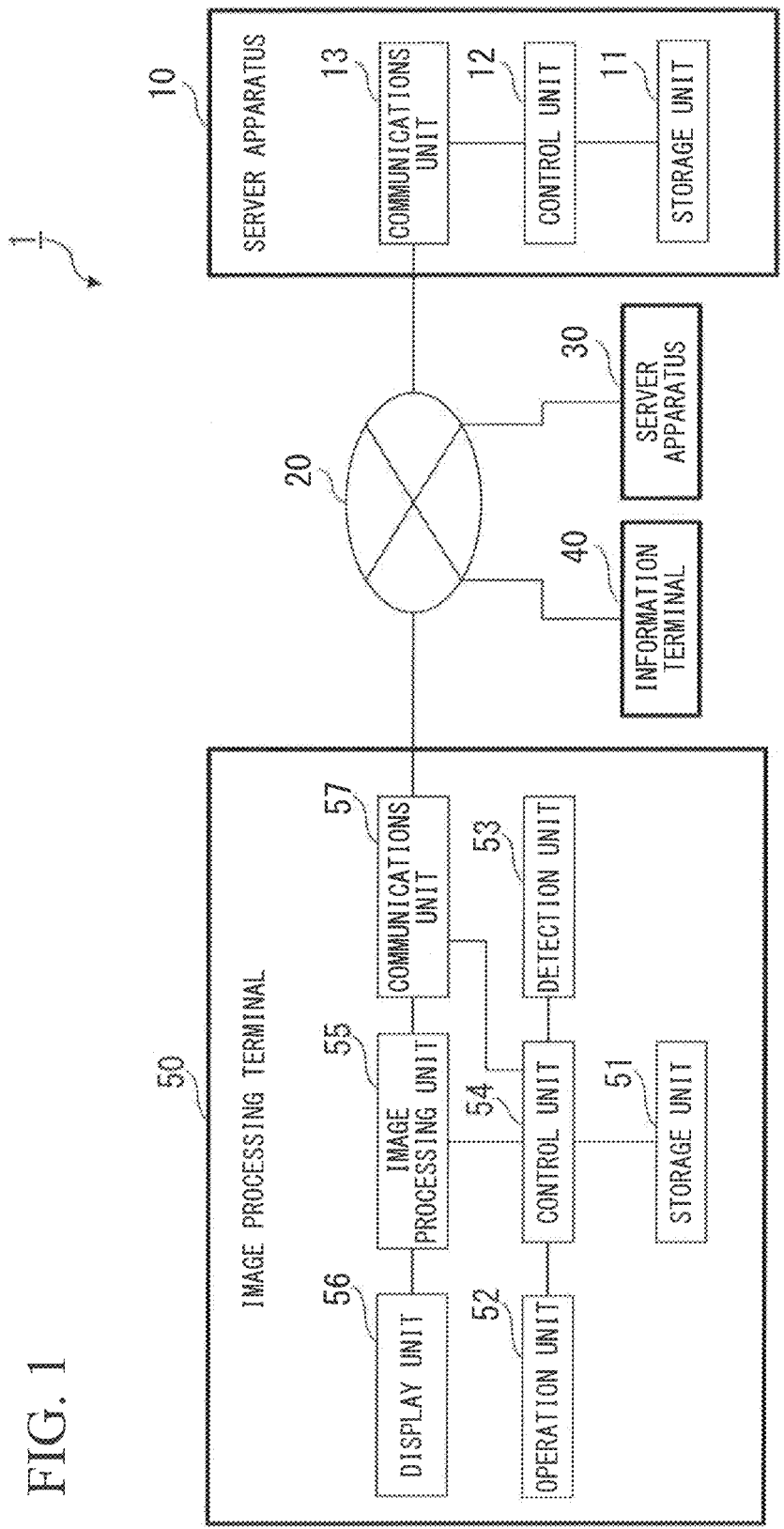
FIG. 1 is a configuration diagram of an image processing system according to an embodiment.

FIG. 1 is a configuration diagram of an image processing system 1 according to the embodiment. The image processing system 1 includes a server apparatus 10; a communications circuit 20; a server apparatus 30; an information terminal 40; and an image processing terminal 50. The image processing system 1 further includes the image processing terminal 50, the server apparatus 30, and the information terminal 40.

In response to a request from the image processing terminal 50, the server apparatus 10 transmits application programs to the image processing terminal 50. The server apparatus 10 includes a storage unit 11, a control unit 12, and a communications unit 13.

The storage unit 11 may be a volatile memory such as a RAM (random access memory), a register, etc., or a non-volatile memory (a non-temporary storage medium) such as an ROM (read only memory), a flash memory, a hard disk drive, etc. The storage unit 11 stores thereon an image processed by the image processing terminal 50.

The storage unit 11 may store thereon application programs for operating a processor such as a CPU, etc. The application programs stored on the storage unit 11 are application programs for the image processing terminal 50 to process the image.

The application programs stored in the storage unit 11 may be application programs for executing predetermined processes. These predetermined processes are processes on order receipt, production, delivery, and charging of a product that use a processed image, for example.

The control unit 12 obtains the application programs from the storage unit 11 in response to the request from the image processing terminal 50. The control unit 12 transmits the obtained application programs to the communications unit 13.

The control unit 12 obtains the image processed by the image processing terminal 50 from the communications unit 13. The control unit 12 causes the storage unit 11 to store thereon the image obtained from the communications unit 13. In response to a request from the server apparatus 30, the control unit 12 obtains the image processed by the image processing terminal 50 from the storage unit 11. The control unit 12 transmits an image obtained from the storage unit 51 to the communications unit 13.

The control unit 12 receives information via the communications unit 13 from the information terminal 40. This information is information for a popularity vote for the image processed by the image processing terminal 50, for example.

Based on a communications protocol, the communications unit 13 executes communications with the server apparatus 30 via the communications circuit 20. This communications protocol, which is not limited to a specific communications protocol, may be any communications protocol. The communications protocol may be a file transfer protocol (FTP), a hypertext transfer protocol (HTTP), for example. The communications unit 13 communicates image data. The communications unit 13 may communicate data described with a hypertext markup language (HTML).

Based on the communications protocol, the communications unit 13 executes communications with the information terminal 40 via the communications circuit 20. Based on the communications protocol, the communications unit 13 executes communications with the image processing terminal 50 via the communications circuit 20. The communications unit 13 transmits the application programs to the image processing terminal 50. The communications unit 13 transmits an image processed by the image processing terminal 50 to the server apparatus 30 and the information terminal 40.

When the server apparatus 30 executes the processes on the order receipt, the production, the delivery, and the charging of the product that use the processed image, the communications unit 13 may transmit the image processed by the image processing terminal 50 to the server apparatus 30.

The communications circuit 20, which is not limited to a specific communications circuit, may be any communications circuit. The communications circuit may be a wireless circuit or a wired circuit.

The server apparatus 30 is a server apparatus which provides a social networking service (SNS). This social networking service is a service such that the information terminal 40, the image processing terminal 50, etc., share the image processed by the image processing terminal 50, for example. This social networking service may provide the information on the popularity vote for the image processed by the image processing terminal 50.

The information terminal 40 obtains an image processed by the image processing terminal 50 from the server apparatus 30. The information terminal 40 displays the image processed by the image processing terminal 50 on a display unit of the information terminal 40. The information terminal 40 transmits the information on the popularity vote for the image processed by the image processing terminal 50 to the server apparatus 30.

The information terminal 50 is an information terminal which executes image processing. The image processing terminal 50 may be a smartphone, a tablet terminal, a personal computer, a mobile telephone terminal, for example. The image processing terminal 50 includes a storage unit 51, an operation unit 52, a detection unit 53, a control unit 54, an image processing unit 55, a display unit 56, and a communications unit 57.

Some or all of the control unit 54, the image processing unit 55, and the communications unit 57 are software function units which function by a processor such as a CPU (central processing unit), etc., executing application programs stored in the storage unit 51, for example. Some or all of these function units may be hardware function units such as an LSI (large scale integration), an ASIC (application specific integrated circuit), etc.

The storage unit 51 may be the volatile memory such as the RAM, the register, etc., or the non-volatile memory (the non-temporary storage medium) such as the ROM, the flash memory, the hard disk drive, etc. The storage unit 51 may store thereon the application programs for operating the processors such as the CPU, etc. This application program is an application program obtained from the storage unit 11 of the server apparatus 10, for example. This application program is an application program for the image processing terminal 50 to process the image, for example.

The storage unit 51 stores thereon a basic image. The basic image may be any image, and is not limited to a specific image. The basic image is an image which shows an external appearance of a product, for example. This product is not limited to a specific product. This product may be clothing such as T-shirts, for example. This product may be tableware such as a mug, etc., for example.

The storage unit 51 stores an additional image and management information on the additional image. The additional image is an image for processing the basic image. This additional image is an image (below called "a handwritten image") which is handwritten by a user by operating the operation unit 52 such as a touch panel, etc., for example. This additional image may be a letter image (below-called "a letter image") which is selected by the user by operating the operation unit 52. The additional image may be an image (below-called "a selected image") which is selected by the user by operating the operation unit 52. This selected image is an image such as a photograph, computer graphics, etc., for example. The storage unit 51 may obtain the additional image from the control unit 54. The storage unit 51 may store thereon the additional image in advance.

FIG. 2 is a diagram of management information on the additional image according to the embodiment. As one example, items for the management information on the additional image include the identification number, an X coordinate, a Y coordinate, a hue, a chroma, a shape, the length in the X direction, the length in the Y direction, and the sensitivity. These items are mutually collated.

The identification number is an identification number which is collated to a partial image of the additional image. The X coordinate is a coordinate on the X-axis that is specified in a display screen of the display unit 56, the additional image, the basic image, etc. The Y coordinate is a coordinate on the Y-axis, which is orthogonal to the X-axis, that is specified in the display screen of the display unit 56, the additional image, the basic image, etc.

The hue is a hue of the partial image. The hue is a hue which expresses paints or ink, for example. The chroma is a chroma of the partial image. The larger the value of the chroma, the higher the chroma. The shape is a shape of the partial image. The length in the X direction is a length of the X-axis direction of the partial image. The length in the Y direction is a length of the Y-axis direction of the partial image.

The sensitivity is a value which shows how easy the partial image may change. The sensitivity is specified in accordance with an operation signal in response to an operation on the operation unit 52, for example. The partial image may change more easily the larger the value of the collated sensitivity.

Returning to FIG. 1, explanations of the configuration diagram of the image processing system 1 are continued. The operation unit 52 detects an operation. The operation unit 52 is a touch panel, for example. The operation unit 52 may be provided in as display screen of the display unit 56.

The user may provide vibrations to the image processing terminal 50. Moreover, the user may swing the image processing terminal 50. When the image processing terminal 50 is provided the vibrations (shaken) by the user, etc., the detection unit 53 may detect movement speed, the number of movements, acceleration, etc., of the image processing terminal 50. The detection unit 53 is an acceleration sensor, for example.

The control unit 54 obtains a detection signal which shows the movement speed of the image processing terminal 50 from the detection unit 53. The control unit 54 obtains a detection signal which shows the times of movement of the image processing terminal 50 from the detection unit 53. The control unit 54 obtains a detection signal which shows the acceleration of the image processing terminal 50 from the detection unit 53. The detection signal which shows this acceleration includes direction information on the acceleration and magnitude information on the acceleration. The detection signal which shows this acceleration may be expressed using an acceleration vector. The control unit 54 obtains an operation signal in response to an operation on the operation unit 52 from the operation unit 52.

The control unit 54 stores thereon the additional information on the storage unit 51. The control unit 54 transmits the additional information to the image processing unit 55. The control unit 54 causes the storage unit 51 to store thereon information received by the communication unit 57. The control unit 54 transmits information identifying the image processing terminal 50 to the communications unit 57.

The image processing unit 55 obtains a basic image (a first image) via the control unit 54 from the storage unit 51. The image processing unit 55 obtains an additional image (a second image) via the control unit 54 from the storage unit 51.

When the detection signal or the operation signal is obtained from the control unit 54, the image processing unit 55 specifies the partial image of the additional image. For example, the image processing unit 55 specifies the partial image of the additional image in accordance with the magnitude of the acceleration shown by the detection signal. The image processing unit 55 may specify the partial image of the additional image in accordance with the movement speed and the times of movement of the image processing terminal 50 shown by the detection signal.

The image processing unit 55 changes the specified partial image by a method specified by the user via the operation unit 52. The image processing unit 55 changes the partial image of the additional image in response to the detection signal obtained from the detection unit 53. The image processing unit 55 may change the partial image of the additional image in response to the operation signal obtained from the operation unit 52.

Figure 3:
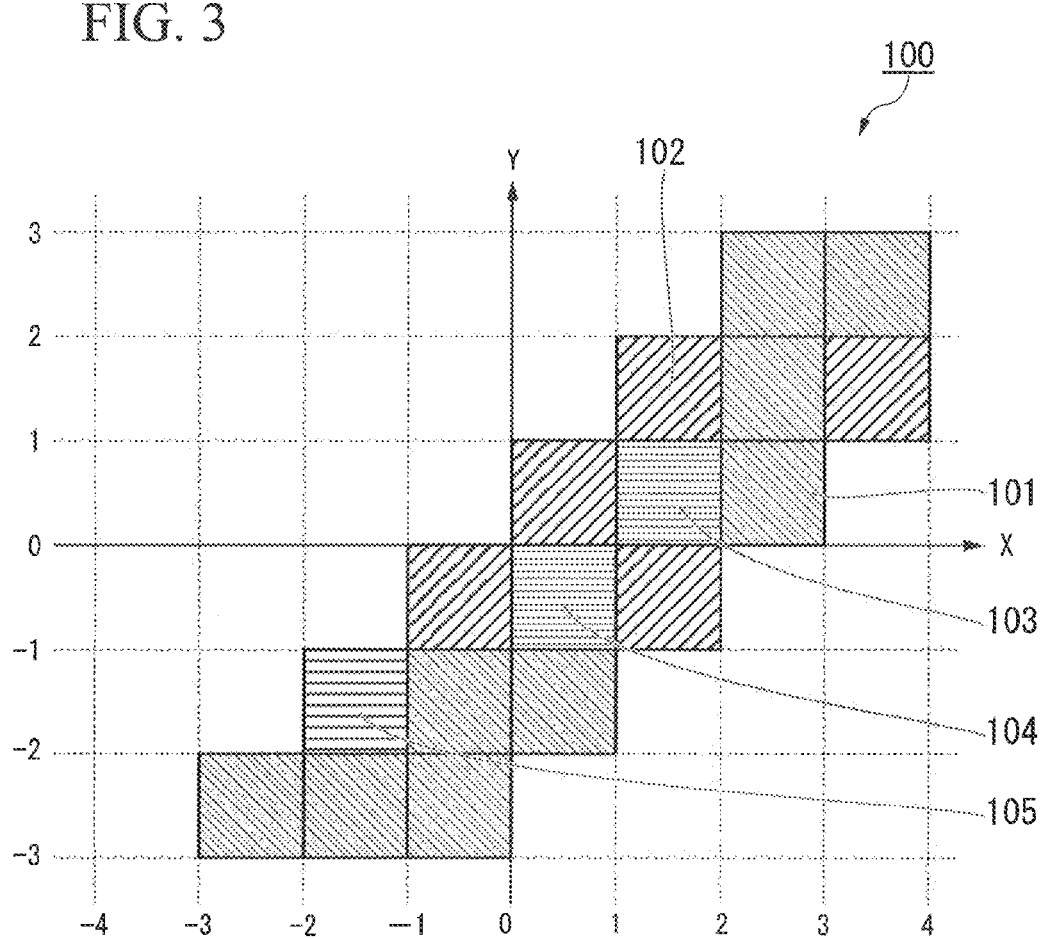
FIG. 3 is a diagram of the additional image according to the embodiment.

FIG. 3 is a diagram of an additional image 100 in the embodiment. The additional image 100 may be any image, and is not limited to a specific image. For example, the additional image 100 is a handwritten image which is handwritten by the user via the operation unit 52. In FIG. 3, the additional image 100 includes, as one example, a partial image 101, a partial image 102, a partial image 103, a partial image 104, and a partial image 105. In FIG. 3, the shape of the respective partial images is a rectangle as one example.

Figure 4:
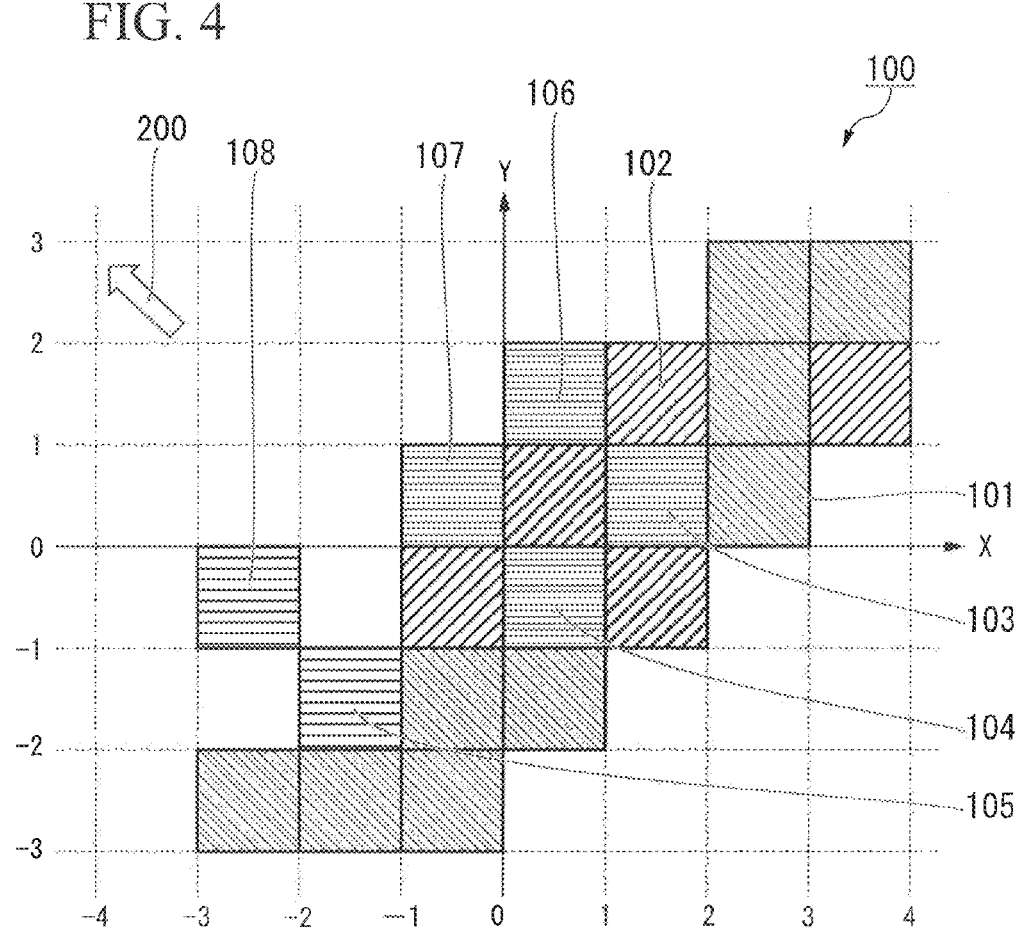
FIG. 4 is a diagram of the additional image including splashed partial images according to the embodiment.

FIG. 4 is a diagram of the additional image including splashed partial images according to the embodiment. Below, a case is explained of the image processing terminal 50 swung by the user to cause the detection signal which shows an acceleration vector 200 to be transmitted by the detection unit 53 to the control unit 54. The display unit 56 does not display an arrow image which shows the acceleration vector 200.

The image processing unit 55 specifies a threshold in accordance with the length of the acceleration vector 200 (the magnitude of the acceleration). The image processing unit 55 specifies a partial image whose sensitivity is at least this threshold. In FIG. 4, the partial images whose sensitivity is at least this threshold are partial images 103, 104, and 105, as one example. When the user selects splashing, the image processing unit 55 splashes the specified partial images 103, 104, and 105.

The image processing unit 55 specifies the coordinate which is a distance in accordance with the length of the acceleration vector 200 (the magnitude of the acceleration) away in the direction of the acceleration vector 200 (the direction of the acceleration) with the coordinate of the specified partial image 103 as a reference. The image processing unit 55 adds a partial image 106 to this specified coordinate. Contents of the management information on the partial image 106 are specified based on the operation signal and the detection signal, for example. For example, the chroma of the partial image 106 may differ from the chroma of the partial image 103. For example, the magnitude of the partial image 106 may differ from the magnitude of the partial image 103.

The image processing unit 55 specifies the coordinate which is a distance in accordance with the length of the acceleration vector 200 away in the direction of the acceleration vector 200 with the coordinate of the specified partial image 104 as a reference. The image processing unit 55 adds a partial image 107 to this specified coordinate. Contents of the management information on the partial image 107 are specified based on the operation signal and the detection signal, for example. For example, the chroma of the partial image 107 may differ from the chroma of the partial image 104. For example, the magnitude of the partial image 107 may differ from the magnitude of the partial image 104.

The image processing unit 55 specifies the coordinate which is a distance in accordance with the length of the acceleration vector 200 away in the direction of the acceleration vector 200 with the coordinate of the specified partial image 105 as a reference. The image processing unit 55 adds a partial image 108 to this specified coordinate. Contents of the management information on the partial image 108 are specified based on the operation signal and the detection signal, for example. For example, the chroma of the partial image 108 may differ from the chroma of the partial image 105. For example, the magnitude of the partial image 108 may differ from the magnitude of the partial image 105.

Figure 5:
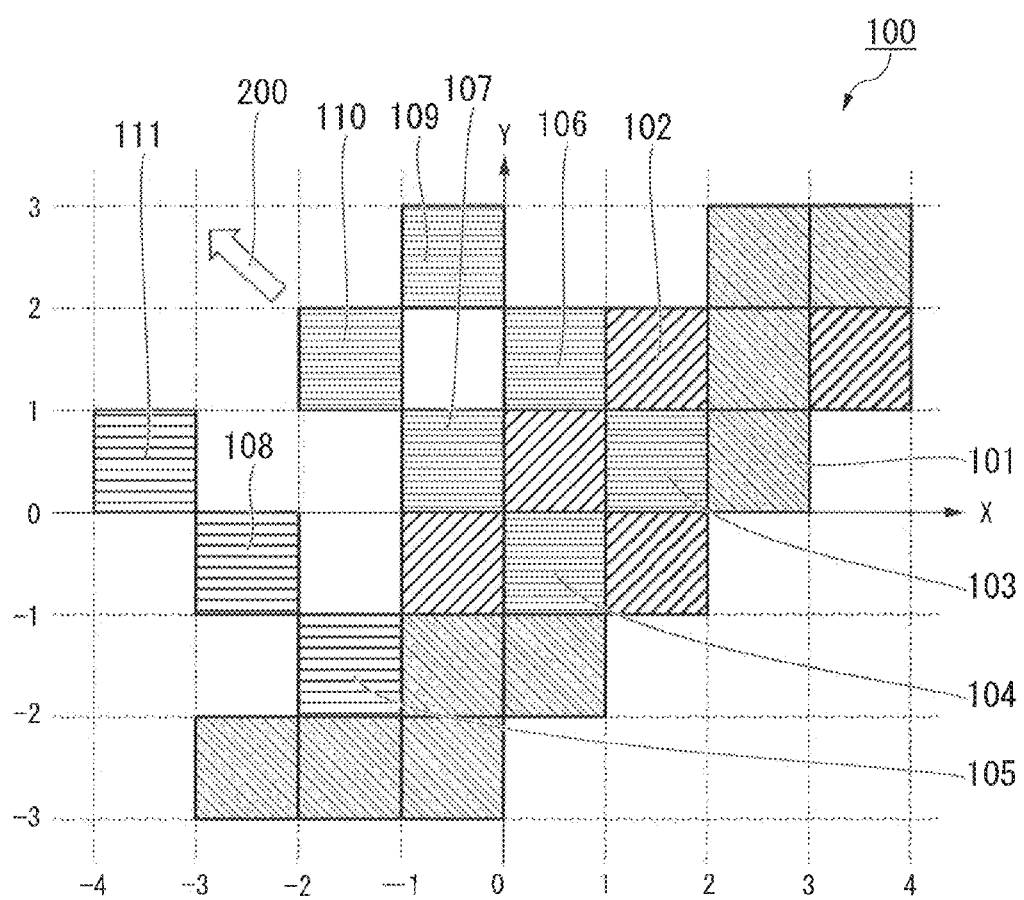
FIG. 5 is a diagram of the additional image including further splashed partial images according to the embodiment.

FIG. 5 is a diagram of the additional image 100 including further splashed partial images according to the embodiment. In a manner similar to the case shown in FIG. 4, the mage processing unit 55 specifies the coordinate which is a distance in accordance with the length of the acceleration vector 200 away in the direction of the acceleration vector 200 with the coordinate of the partial image 106 as a reference. The image processing unit 55 adds a partial image 109 to this specified coordinate.

In a manner similar to the case shown in FIG. 4, the image processing unit 55 specifies the coordinate which is a distance in accordance with the length of the acceleration vector 200 away in the direction of the acceleration vector 200 with the coordinate of the partial image 107 as a reference. The image processing unit 55 adds a partial image 110 to this specified coordinate.

In a manner similar to the case shown in FIG. 4, the image processing unit 55 specifies the coordinate which is a distance in accordance with the length of the acceleration vector 200 away in the direction of the acceleration vector 200 with the coordinate of the partial image 108 as a reference. The image processing unit 55 adds a partial image 111 to this specified coordinate.

Figure 6:
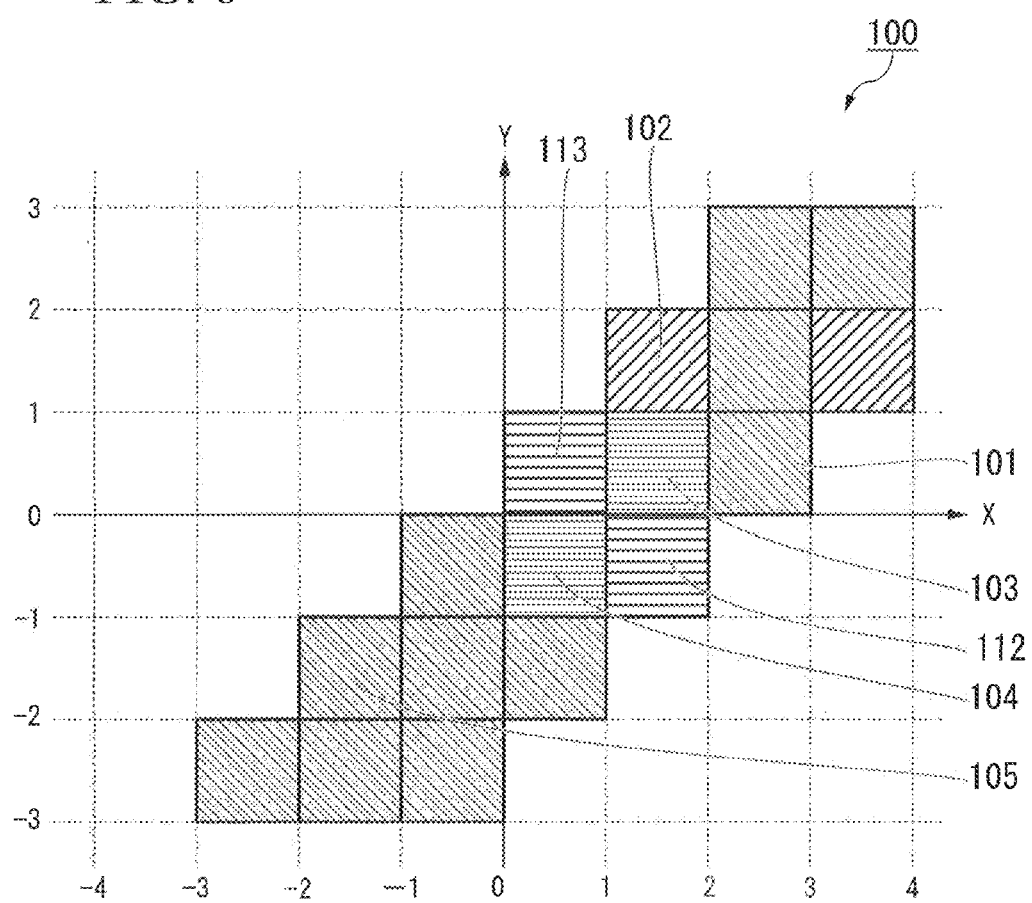
FIG. 6 is a diagram of the additional image according to the embodiment.

FIG. 6 is a diagram of the additional image 100 according to the embodiment. For example, the additional image 100 is a letter image selected by the user operating the operation unit 52. In FIG. 6, as one example, the additional image 100 includes a partial image 101, a partial image 102, a partial image 103, a partial image 104, a partial image 105, a partial image 112, and a partial image 113.

Figure 7:
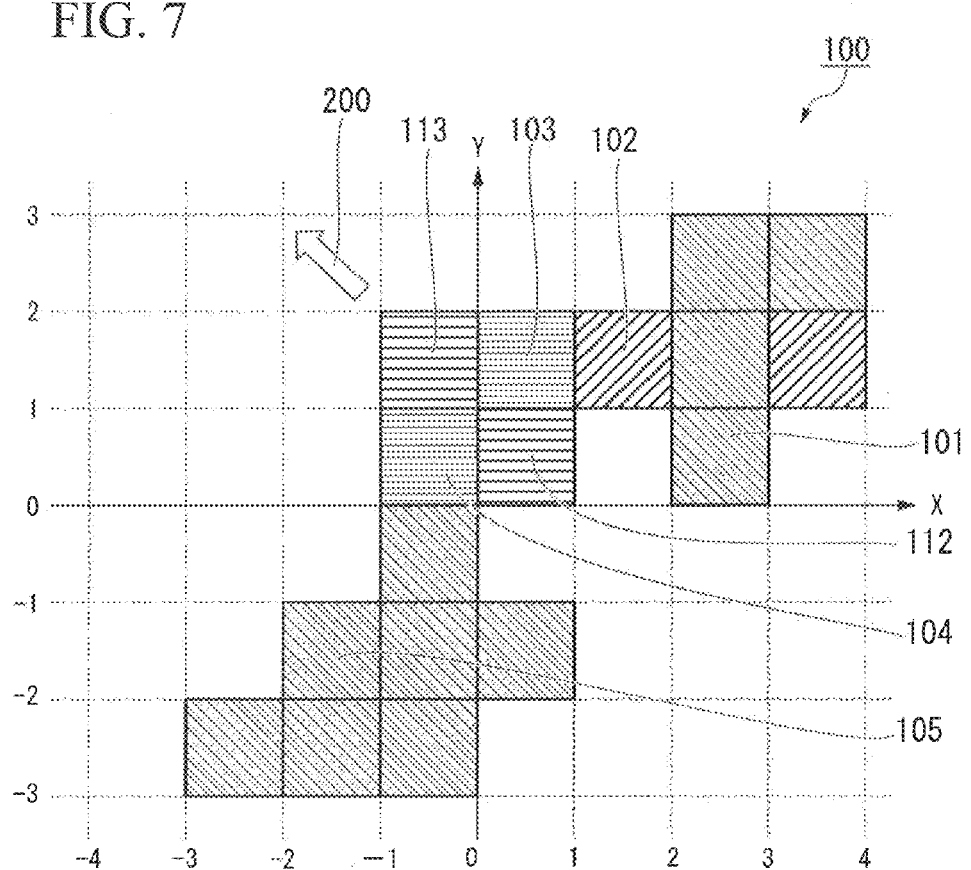
FIG. 7 is a diagram of the additional image including moved partial images according to the embodiment.

FIG. 7 is a diagram of the additional image including moved partial images according to the embodiment. In a manner similar to the case shown in FIG. 4, the image processing unit 55 specifies the partial image. In FIG. 6, the partial images whose sensitivity is at least the threshold are, as one example, the partial image 103, the partial image 104, the partial image 112, and the partial image 113.

When a GLITCH is selected by the user, or in other words, when a user selected a GLITCH, the image processing unit 55 moves the specified partial image 103, partial image 104, partial image 112, and partial image 113. The image processing unit 55 moves the specified partial image 103 in the direction of the acceleration vector 200 to a distance in accordance with the length of the acceleration vector 200. The same applies also to the partial image 104, the partial image 112, and the partial image 113.

Figure 8:
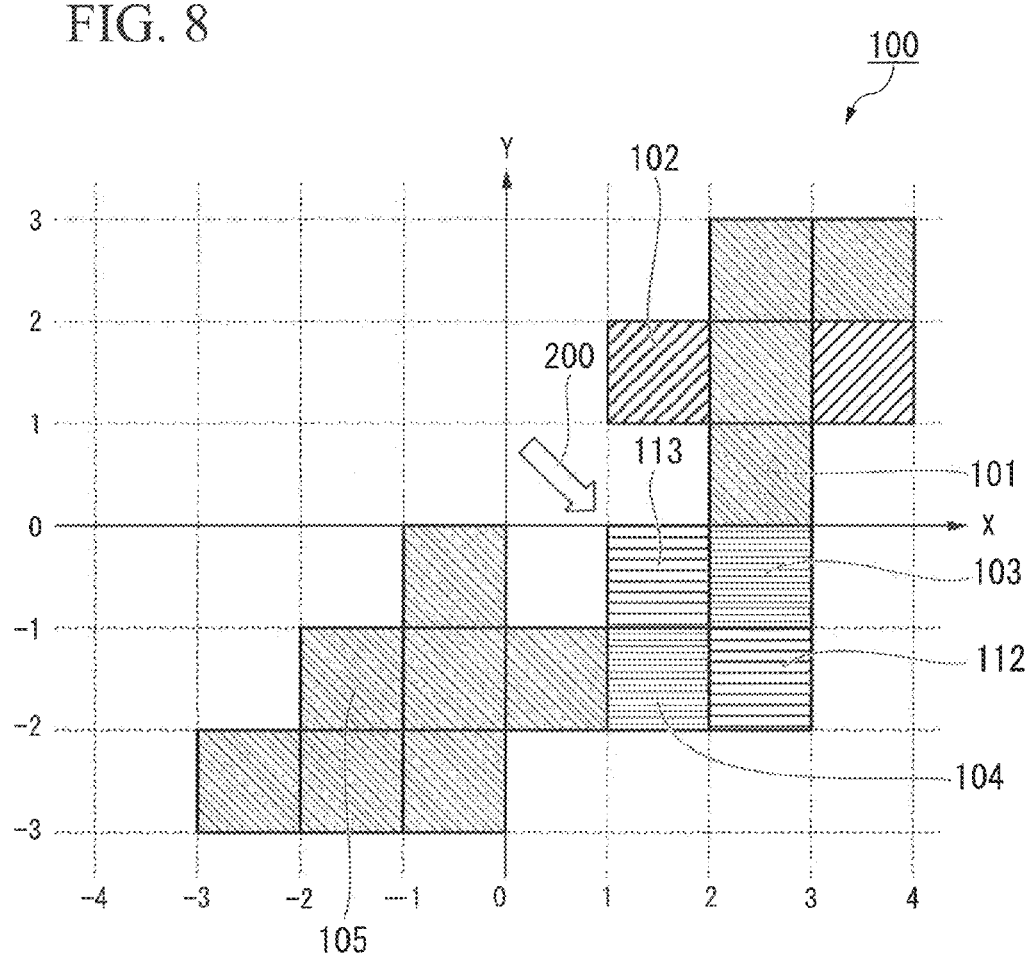
FIG. 8 is a diagram of the additional image including further moved partial images according to the embodiment.

FIG. 8 is a diagram of the additional image 100 including further moved partial images according to the embodiment. In FIG. 8, in comparison to FIG. 7, the direction of the acceleration vector 200 is the opposite. The image processing unit 55 moves the specified partial image 103 in the direction of the acceleration vector 200 to a distance in accordance with the length of the acceleration vector 200. The same applies also to the partial image 104, the partial image 112, and the partial image 113. In this way, the image processing unit 55 may cause the display unit 56 to display thereon the additional image 100 which may appear as if there is a glitch in the display unit 56.

In accordance with the period in which the direction of the acceleration vector 200 reverses, the magnitude of the moved partial image 103 may be changed. For example, the shorter the period in which the direction of the acceleration vector 200 reverses, the smaller the magnitude of the moved partial image 103 that may be set.

Figure 9:
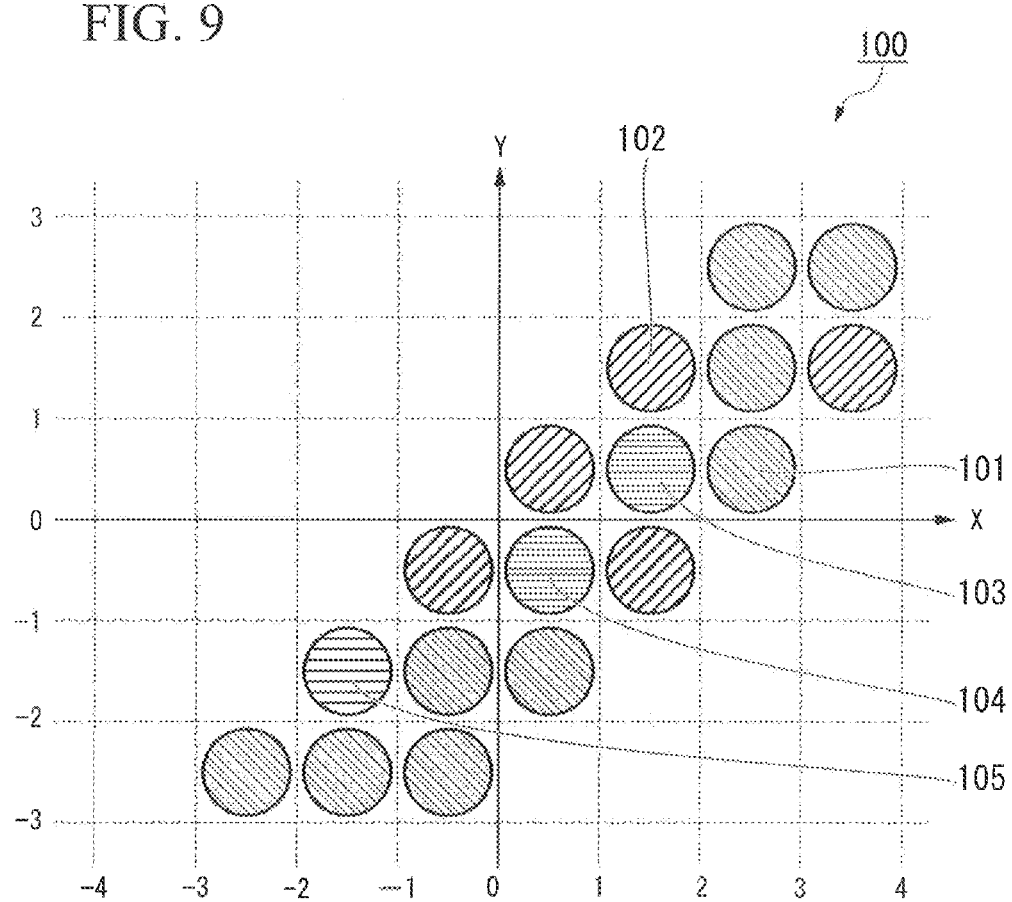
FIG. 9 is a diagram of the additional image according to the embodiment.

FIG. 9 is a diagram of the additional image 100 according to the embodiment. In FIG. 9, the shape of the respective partial images is circular as one example. For example, the additional image 100 is a selected image selected by the user operating the operation unit 52. In FIG. 9, the additional image 100 include, as one example, a partial image 101, a partial image 102, a partial image 103, a partial image 104, and a partial image 105.

Figure 10:
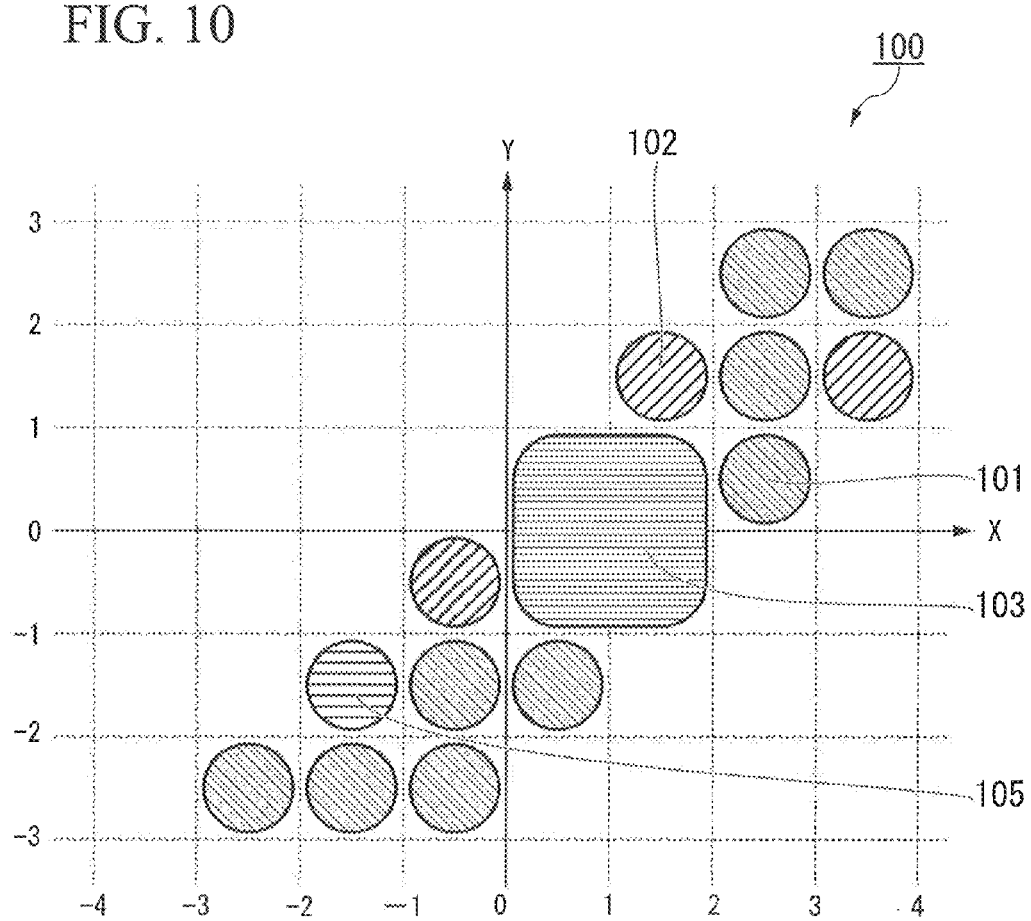
FIG. 10 is a diagram of the additional image including a mosaiced partial image according to the embodiment.

FIG. 10 is a diagram of the additional image 100 including a mosaiced partial image according to the embodiment. In a manner similar to the case shown in FIG. 4, the image processing unit 55 specifies the partial image. In FIG. 10, the partial image whose sensitivity is at least the threshold is a partial image 103 as one example.

When the mosaic is selected by the user, the image processing unit 55 creates a mosaic of the specified partial image 103. For example, the image processing unit 55 changes the shape of the partial image 103 to a predetermined shape. This predetermined shape is a rectangle, for example. For example, the image processing unit 55 enlarges the size of the partial image 103 (mesh) to include the partial image 104, etc., in the partial image 103.

The image processing unit 55 determines whether all of the specified partial images are changed. When all of the specified partial images are changed, the image processing unit 55 processes a basic image using the changed additional image 100. For example, the image processing unit 55 overlaps the changed additional image 100 to the basic image to process the basic image. The image processing unit 55 uses an image filter to undergo a transmission process or a multiplication process to the additional image 100 or the basic image. The image processing unit 55 may expand or reduce the additional image 100 or the basic image.

The display unit 56 displays an image generated by the image processing unit 55. For example, the display unit 56 displays the basic image 302 which is processed using the changed additional image 100. For example, the display unit 56 displays an image which guides an operation of the image processing terminal 50. The display unit 56 may be integrally included in the image processing terminal 50 with the operation unit 52 of the touch panel, etc.

The communications unit 57 executes communications with the server apparatus 10 and the server apparatus 30 via the communications circuits 20 based on the communications protocol. This communications protocol, which is not limited to a specific communications protocol, may be any communications protocol. The communications protocol may be a file transfer protocol, a hypertext transfer protocol, for example. The communications unit 57 communicates image data. The communications unit 57 may communicate data described with a hypertext markup language.

The communications unit 57 transmits control information such as information on identifying the image processing terminal 50, etc., to the server apparatus 10. The communications unit 57 transmits information requesting the application programs to the server apparatus 10. The communications unit 57 transmits the processed basic image using the changed additional information 100. The communications unit 57 receives the application programs from the server apparatus 10.

Next, an operation of the image processing terminal 50 is described.

Figure 11:
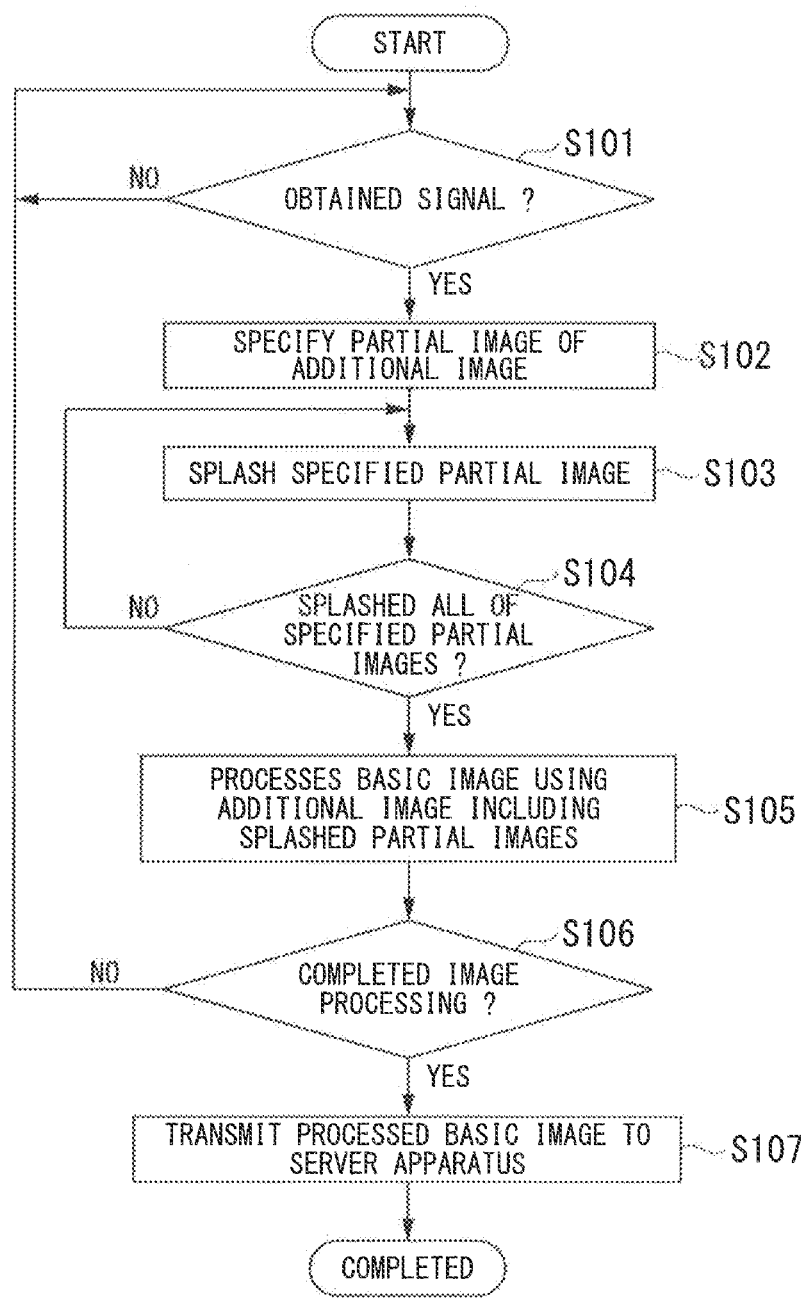
FIG. 11 is a flowchart of a process of processing a basic image using the additional image including a splashed partial image.

FIG. 11 is a flowchart of a process of processing the basic image using the additional image including the splashed partial images according to the embodiment.

The image processing unit 55 determines whether a detection signal, etc., is obtained (step S101). If the detection signal, etc., is not obtained (step S101: NO), the image processing unit 55 returns the process to step S101.

When the detection signal, etc., is obtained (step S101: YES), the image processing unit 55 specifies the partial images of the additional image 100 to the server apparatus 10. For example, the image processing unit 55 specifies the partial images based on the sensitivity collated to the partial image of the additional image 100 (step S102).

The image processing unit 55 splashes the specified partial images (step S103).

The image processing unit 55 determines whether all of the specified partial images are splashed (step S104). If there is an unsplashed partial image remaining of the specified partial images (step S104: NO), the image processing unit 55 returns the process to step S103. If all of the specified partial images are splashed (step S104: YES), the image processing unit 55 processes the basic image using the additional image 100 including the splashed partial images (step S105).

The image processing unit 55 determines whether the image processing is completed (step S106). The image processing unit 55 determines whether the image processing is to be completed based on an operation signal obtained from the operation unit 52, for example. The image processing unit 55 may determine whether the image processing is completed based on whether the number of times of processing the basic image reached an upper limit on the number of times, for example.

When the image processing is not completed (step S106: NO), the image processing unit 55 returns the process to step S101. When the image processing is completed (step S106: YES), the image processing unit 55 transmits the processed basic image to the communications unit 57. The communications unit 57 transmits the processed basic image to the server apparatus 10. The communications unit 57 transmits the number for identifying the image processing terminal 50 to the server apparatus 10. The communications unit 57 may transmit information requesting a process of order receipt of a product to the server apparatus 10.

Figure 12:
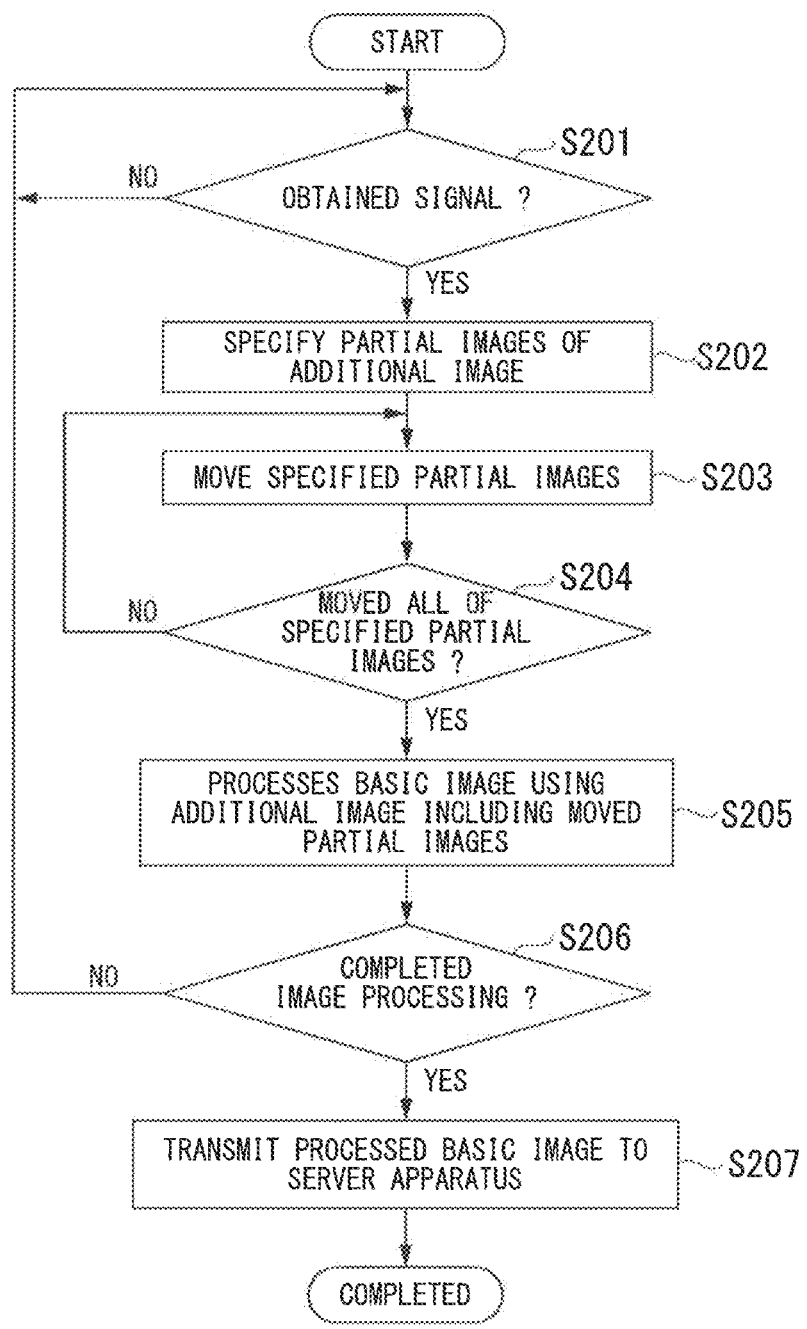
FIG. 12 is a flowchart of a process of processing the basic image using the additional image including a moved partial image.

FIG. 12 is a flowchart of a process of processing the basic image using the additional image 100 including the moved partial images.

The image processing unit 55 determines whether a detection signal, etc., is obtained (step S201). If the detection signal, etc., is not obtained (step S201: NO), the image processing unit 55 returns the process to step S201.

If the detection signal, etc., is obtained (step S201: YES), the image processing unit 55 specifies the partial images of the additional image 100. Based on the sensitivity collated to the partial images of the additional image 100, for example, the image processing unit 55 specifies the partial images (step S202).

The image processing unit 55 moves the specified partial images (step S203).

The image processing unit 55 determines whether all of the specified partial images are moved (step S204). If there is an unmoved partial image remaining of the specified partial images (step S204: NO), the image processing unit 55 returns the process to step S203. When all of the specified partial images are moved (step S204: YES), the image processing unit 55 processes the basic image using the additional image 100 including the moved partial images (step S205).

The image processing unit 55 determines whether the image processing is completed (Step S206). Based on an operation signal obtained from the operation unit 52, for example, the image processing unit 55 determines whether the image processing is completed. The image processing unit 55 may determine whether the image processing is completed based on whether the number of times of processing the basic image reached an upper limit on the number of times.

If the image processing is not completed (step S206: NO), the image processing unit 55 returns the process to step S201. When the image process is completed (step S206: YES), the image processing unit 55 transmits the processed basic image to the communications unit 57. The communications unit 57 transmits the processed basic image to the server apparatus 10. The communications unit 57 transmits the number identifying the image processing terminal 50 to the server apparatus 10. The communications unit 57 may transmit information requesting the process for order receipt of the product to the server apparatus 10.

Figure 13:
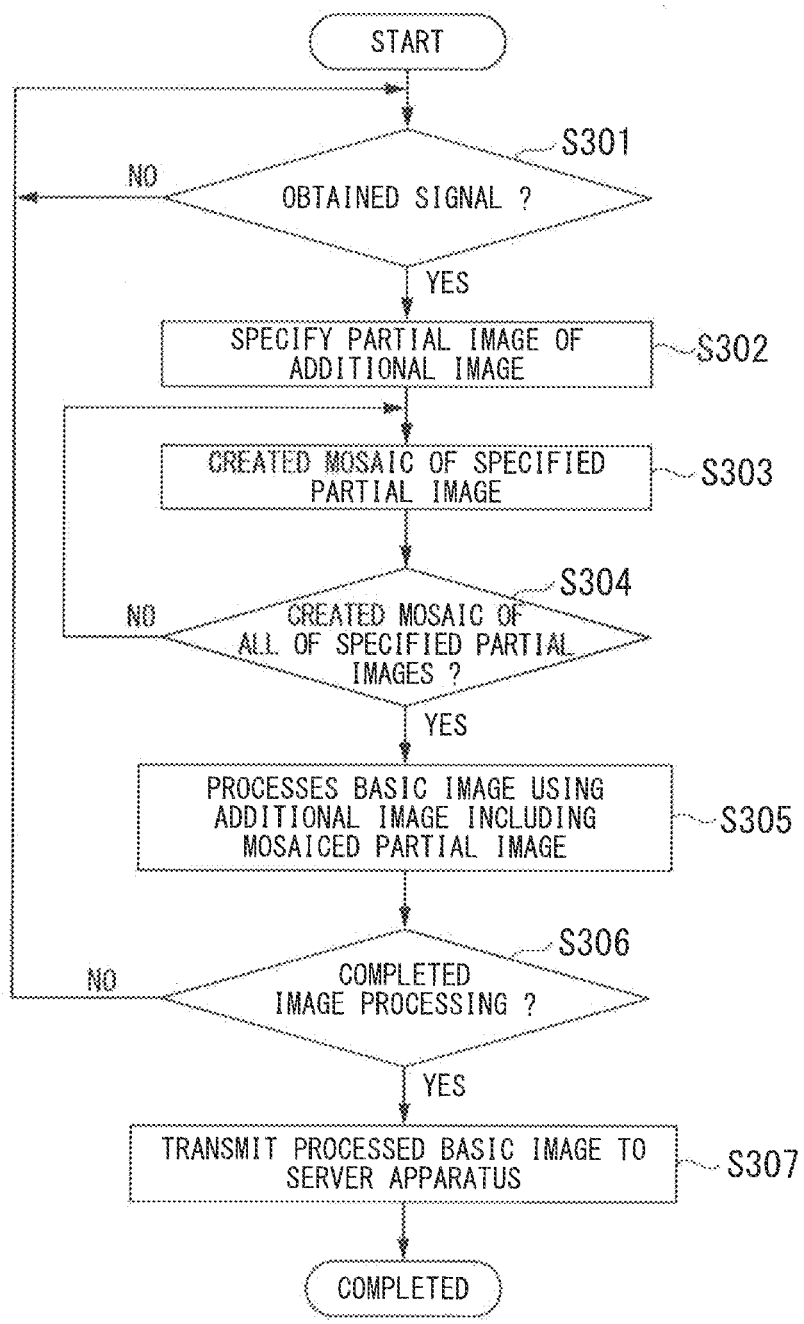
FIG. 13 is a flowchart of a process of processing the basic image using the additional image including a mosaiced partial image.

FIG. 13 is a flowchart of a process of processing the basic image using the additional information 100 including the mosaiced partial image according to the embodiment.

The image processing unit 55 determines whether a detection signal, etc., is obtained (step S301). If the detection signal, etc., is not obtained (step S301: NO), the image processing unit 55 returns the process to step S301.

If the detection signal, etc., is obtained (step S301: YES), the image processing unit 55 specifies the partial image of the additional image 100. For example, based on the sensitivity collated with the partial image of the additional image, for example, the image processing unit 55 specifies the partial image (step S302).

The image processing unit 55 creates a mosaic of the specified partial image (step S303).

The image processing unit 55 determines whether the mosaic of all of the specified partial images is created (step S304). If there is an unmosaiced partial image remaining of the specified partial images (step S304: NO), the image processing unit 55 returns the process to step S303. When all of the specified partial images are moved (step S304: YES), the image processing unit 55 processes the basic image using the additional image 100 including the moved partial image (step S305).

The image processing unit 55 determines whether the image processing is completed (step S306). For example, based on an operation signal obtained form the operation unit 52, the image processing unit 55 determines whether the image processing unit 55 completes the image processing. For example, based on whether the times of processing the basic image reached an upper limit on the number of times, the image processing unit 55 determines whether the image processing is completed.

If the image processing is not completed (NO in step S306), the image processing unit 55 returns the process to step S201. If the image processing is completed (step S306: YES), the image processing unit 55 transmits the processed basic image to the communications unit 57. The communications unit 57 transmits the processed basic image to the server apparatus 10. The communications unit 57 transmits the number identifying the image processing terminal 50 to the server apparatus 10. The communications unit 57 may transmit information requesting the process of order receipt of the product to the server apparatus 10.

Next, an example of an operation of the image processing terminal 50 is described. Below, images shown in FIGS. 14-22 are an example of images guiding an operation of the image processing terminal 50.

Figure 14:
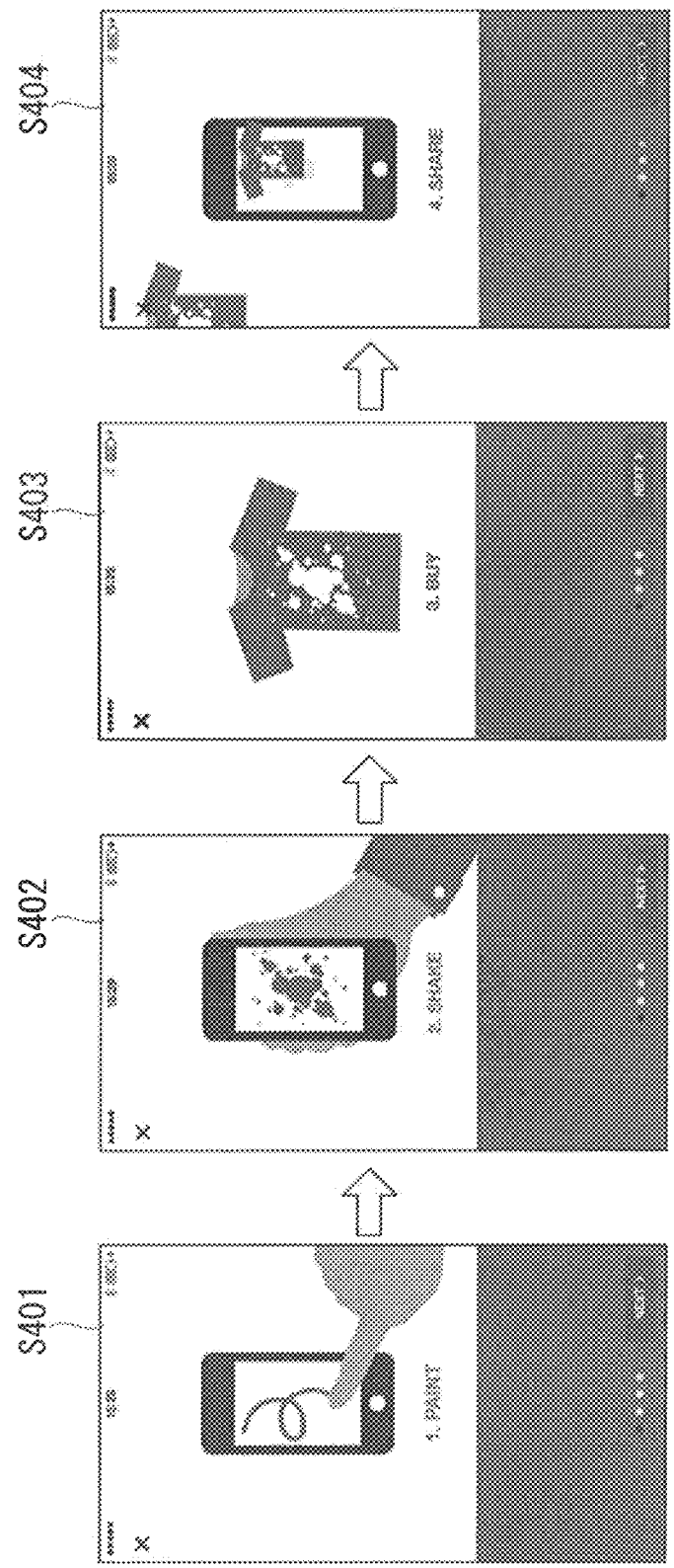
FIG. 14 is a diagram showing an operation of an image processing terminal.

FIG. 14 is a diagram showing an operation of the image processing terminal 50 according to the embodiment. The display unit 56 individually displays images S401-S404. For example, the display unit 56 may display the respective images in the order of the image S401 to the image S404.

The image S401 shows that the additional image can be drawn by operating the operation unit 52. The image S402 shows that the additional image can be processed by operating the operation unit 52. The image S403 shows that a product which uses the processed basic image can be purchased by the user. The image S404 shows that the processed basic image can be shared by operating the operation unit 52.

Figure 15:
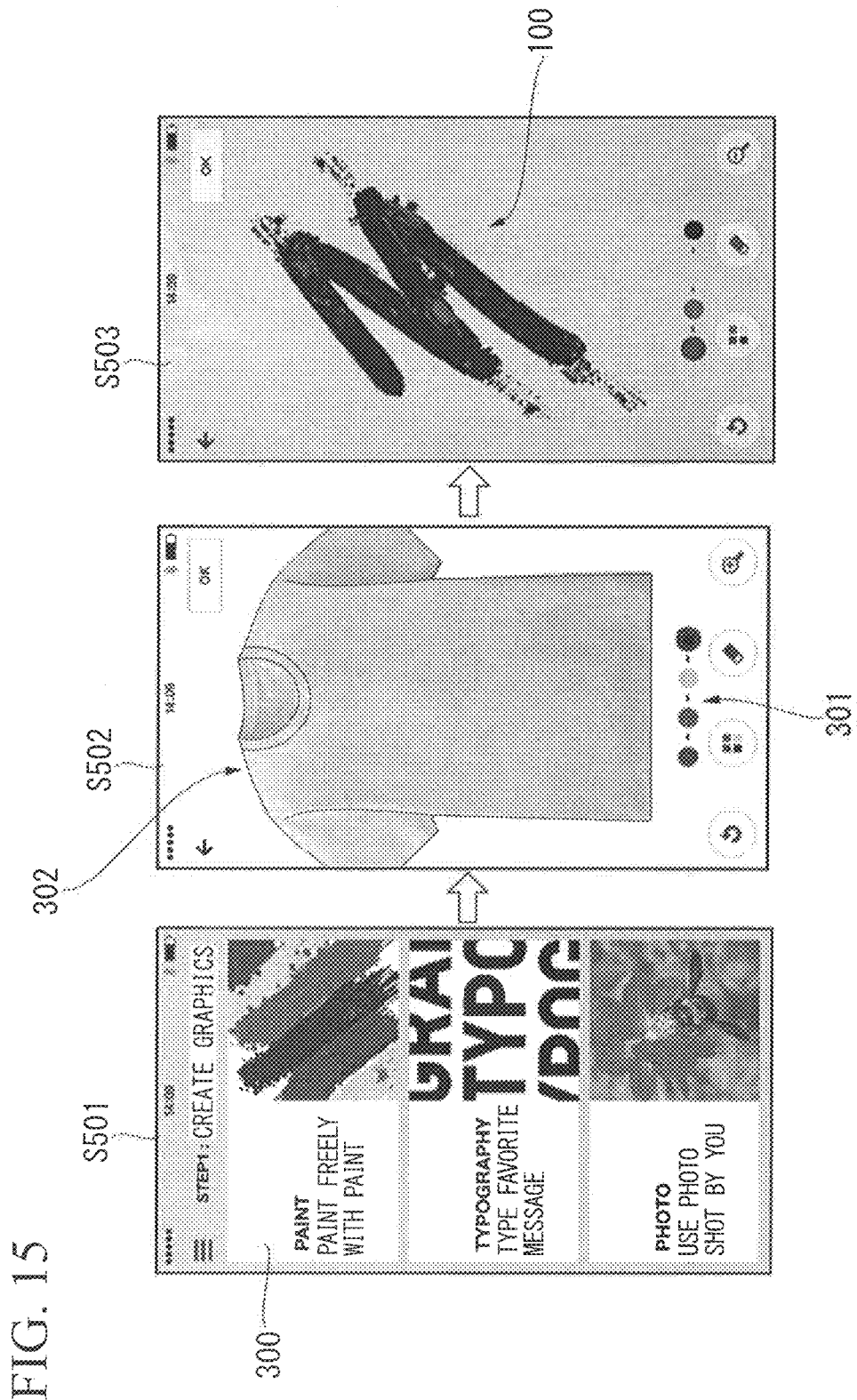
FIG. 15 is a diagram of the additional image according to the embodiment.

FIG. 15 is a diagram of the additional image 100 according to the embodiment. The display unit 56 individually displays the image S501 to S503. For example, the display unit 56 may display the respective images in the order of the image S501 to the image S503.

The image S501 is an image which includes an operation key 300. The operation key 300 is an operation key for the user to instruct the control unit 54 to draw a handwritten image. When the image processing unit 55 obtains an operation signal showing that the operation key 300 is operated from the control unit 54, it generates an image S502. The image S502 is an image including an operation key 301 and a basic image 302. The operation key 301 is an operation key for the user to instruct the control unit 54 a hue of the handwritten image.

The image S503 is an image including the additional information 100 as the handwritten image. The image processing unit 55 processes the basic image 302 using the additional image 100. The image processing unit 55 generates an image S503 including the basic image 302 which is processed using the additional image 100. The image processing unit 55 may enlarge the additional image 100 and the basic image 302.

Figure 16:
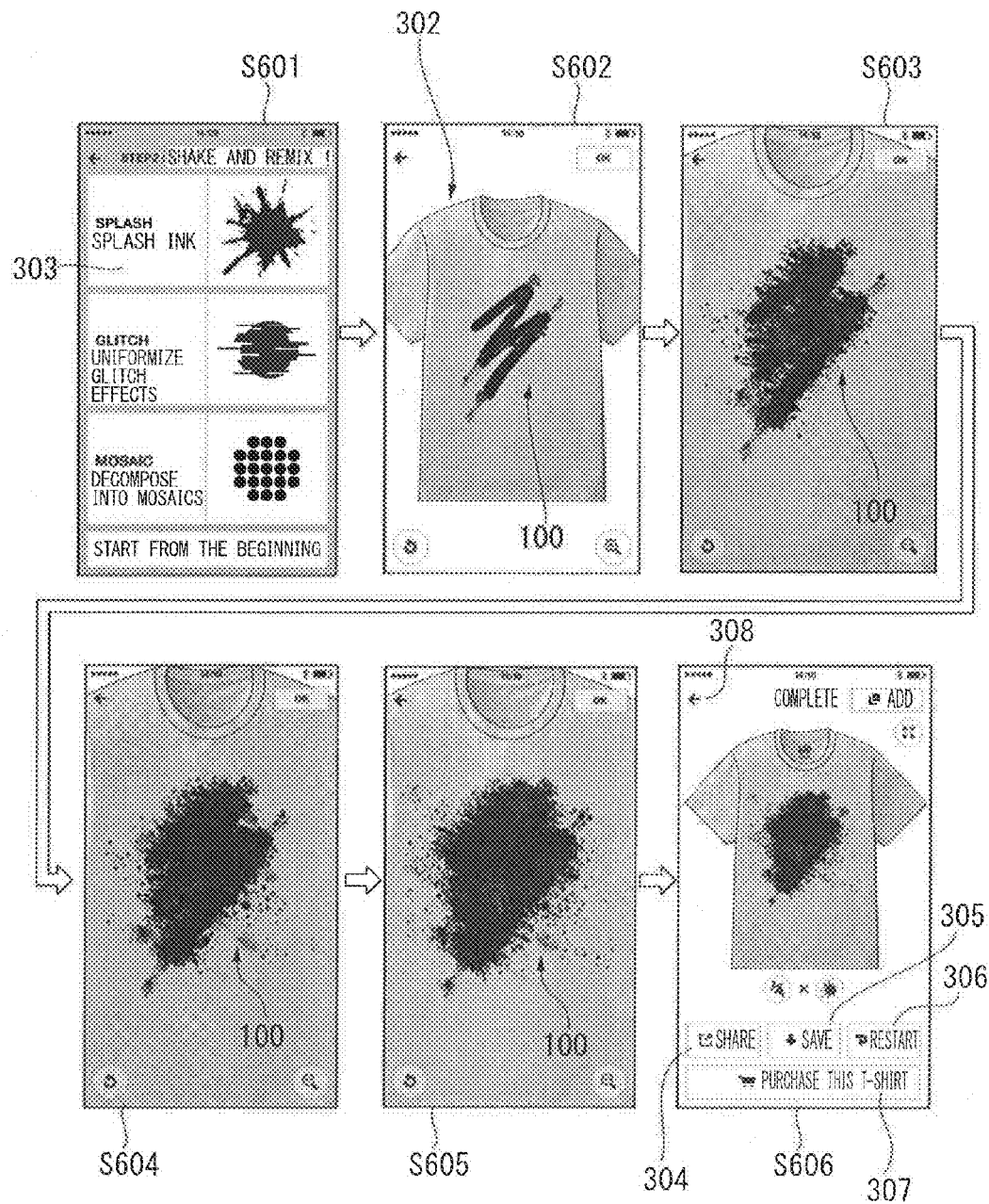
FIG. 16 is a diagram of the additional image including the splashed partial image according to the embodiment.

FIG. 16 is a diagram of the additional image including the splashed partial image according to the embodiment. The display unit 56 individually displays images S601-S606. For example, the display unit 56 displays the respective images in the order of the image S601 to the image S606.

The image S601 is an image including an operation key 303. The operation key 303 is an operation key for the user to instruct the control unit 54 to splash the partial image of the additional image 100. When the image processing unit 55 obtains an operation signal showing that the operation key 303 is operated is obtained from the control unit 54, it generates the image S602. The image S602 is an image including the basic image 302 processed using the additional image 100.

When the image processing unit 55 obtains the detection signal from the control unit 54, it splashes the partial image of the additional image 100. The image S603 is an image including the basic image S302 processed using the additional image 100 in which the partial image is splashed. When the detection signal is further obtained from the control unit 54, the image processing unit 55 splashes the partial image of the additional image 100. The image S604 is an image including the basic image 302 which is processed using the additional image 100 in which the partial image is splashed. When the image processing unit 55 further obtains the detection signal from the control unit 54, it splashes the partial image of the additional image 100. The image S605 is an image including the basic image 302 which is processed using the additional image 100 in which the partial image is splashed.

For example, the image S606 is an image including the processed basic image 302, an operation key 304, an operation key 305, an operation key 306, an operation key 307, and an operation key 308. The operation key 304 is an operation key for causing the basic image 302 which is processed using the additional image 100 to be shared. The operation key 305 is an operation key for causing the basic image 302 which is processed using the additional image 100 to be stored on the storage unit 51. The operation key 306 is an operation key for putting the processed basic image 302 back to the original state. The operation key 307 is an operation key for purchasing as product which uses the processed basic image 302. In other words, the operation key 307 is an operation key for transmitting information requesting a process of order receipt of the product to the server apparatus 10. The operation key 308 is an operation key which puts back the processed basic image 302 to an operation which is one previous thereto.

Figure 17:
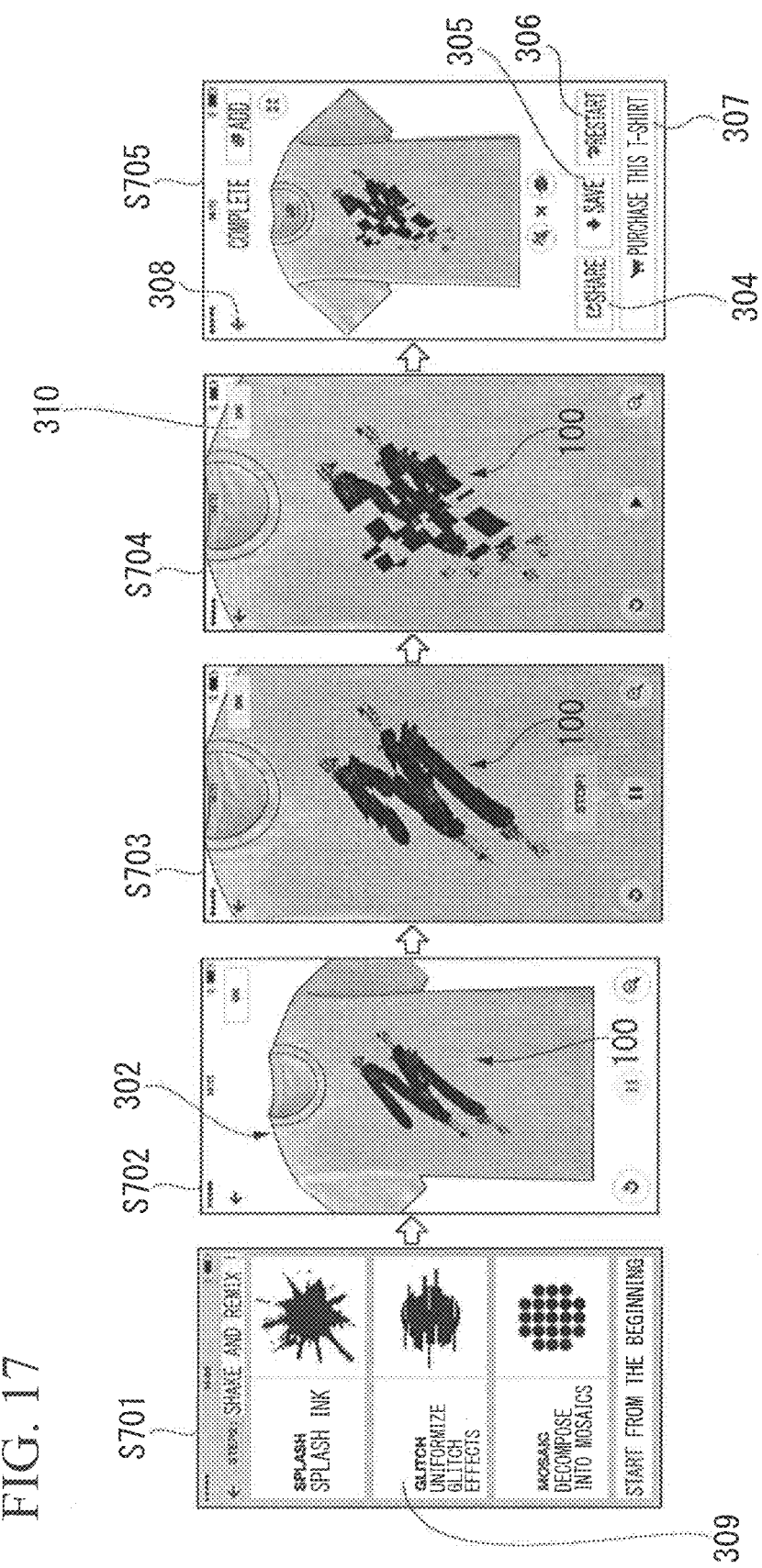
FIG. 17 is a diagram of the additional image including the moved partial image according to the embodiment.

FIG. 17 is a diagram of the additional image including the moved partial image according to the embodiment. The display unit 56 individually displays images S701 to images S705. For example, the display unit 56 may display the respective images in the order of the image S701 to the image S705.

The image S701 is an image including the operation key 309. The operation key 309 is an operation key for the user instructing the control unit 54 to move the partial image of the additional image 100. When the image processing unit 55 obtains an operation signal showing that an operation key 309 is operated from the control unit 54, it generates the image S702. The image S702 is an image including the basic image 302 which is processed using the additional image 100.

When the image processing unit 55 obtains the detection signal from the control unit 54, the partial image of the additional image 100 is moved. The image S703 is an image including the basic image 302 which is processed using the additional image 100 in which the partial image is moved. When the image processing unit 55 further obtains the detection signal from the control unit 54, it moves the partial image of the additional image 100. The image S704 is an image including the operation key 310 and the basic image 302 which is processed using the additional image 100 in which the partial image is moved. The operation key 310 is an operation key for finalizing the additional image 100. When the image processing unit 55 further obtains a detection signal from the control unit 54, the partial image of the additional image 100 is moved. The image S705 is an image which includes, for example, the processed basic image 302, the operation key 304, the operation key 305, the operation key 306, the operation key 307, and the operation key 308.

Figure 18:
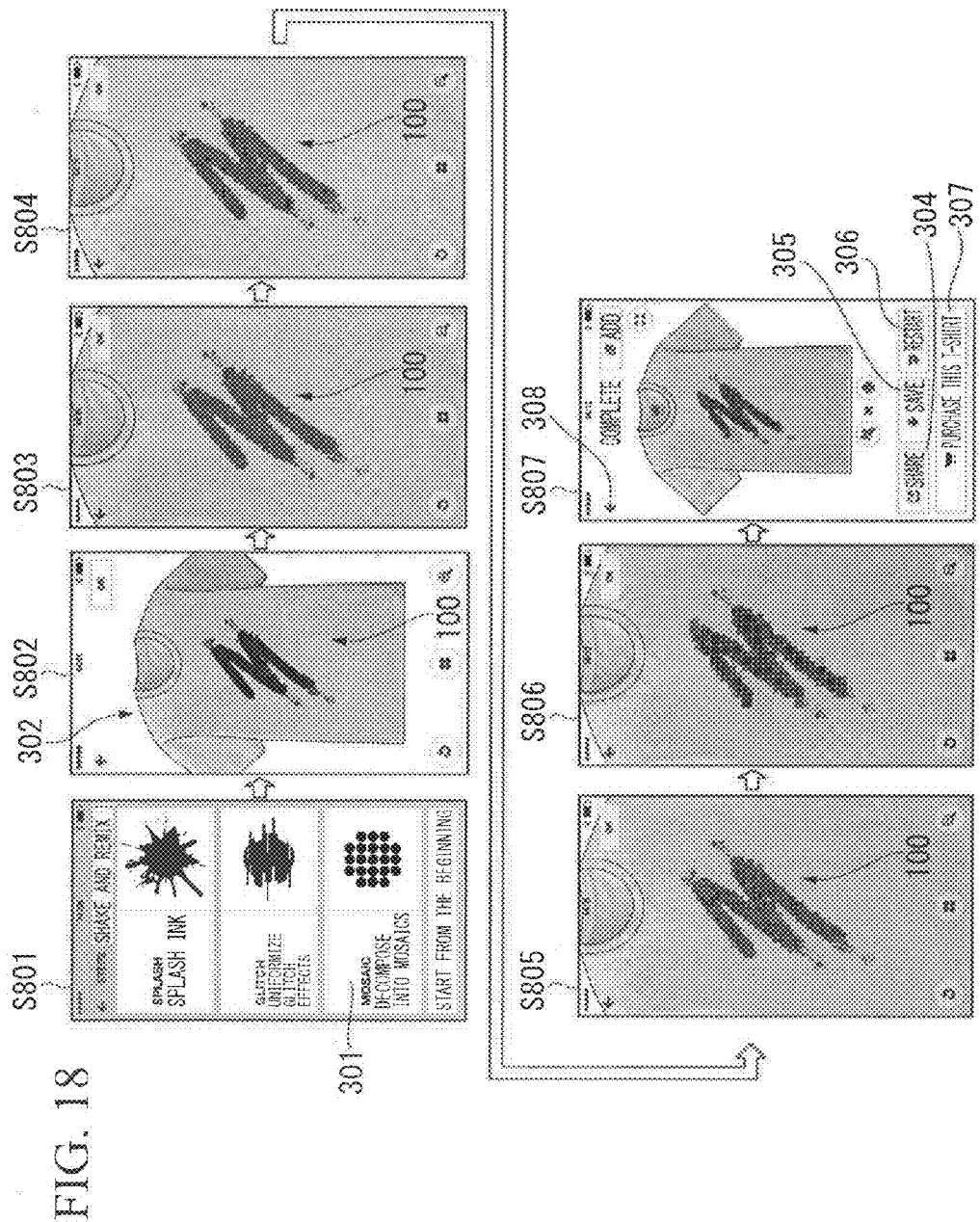
FIG. 18 is a diagram of the additional image including the mosaiced partial image according to the embodiment.

FIG. 18 is a diagram of the additional image including the mosaiced partial image according to the embodiment. The display unit 56 individually displays an image S801, an image S802, an image S803, an image S804, an image S805, an image S806, and an image S807. For example, the display unit 56 may display the respective images in the order of the image S801 to the image S807.

The image S801 is an image including the operation key 310. The operation key 310 is an operation key for the user to instruct the control unit 54 to create a mosaic of the partial image of the additional image 100. When the image processing unit 55 obtains the operation signal which shows that the operation key 310 is operated from the control unit 54, it generates an image S802. The image S102 is an image which includes the basic image 302 which is processed using the additional image 100.

When the image processing unit 55 obtains the detection signal from the control unit 54, it creates a mosaic of the partial image of the additional image 100. The image S803 is an image which includes the basic image 302 which is processed using the additional image 100 in which the partial image is mosaiced. When the image processing unit 55 further obtains the detection signal from the control unit 54, it creates the mosaic of the partial image of the additional image 100.

The image S804 is an image which includes the basic image 302 which is processed using the additional image 100 in which the partial image is mosaiced. When the image processing unit 55 further obtains the detection signal from the control unit 54, it creates a mosaic of the partial image of the additional image 100. The same applies to the image S805 and the image S806. The image S807 is an image which includes the processed basic image 302, the operation key 304, the operation key 305, the operation key 306, the operation key 307, and the operation key 308, for example.

Figure 19:
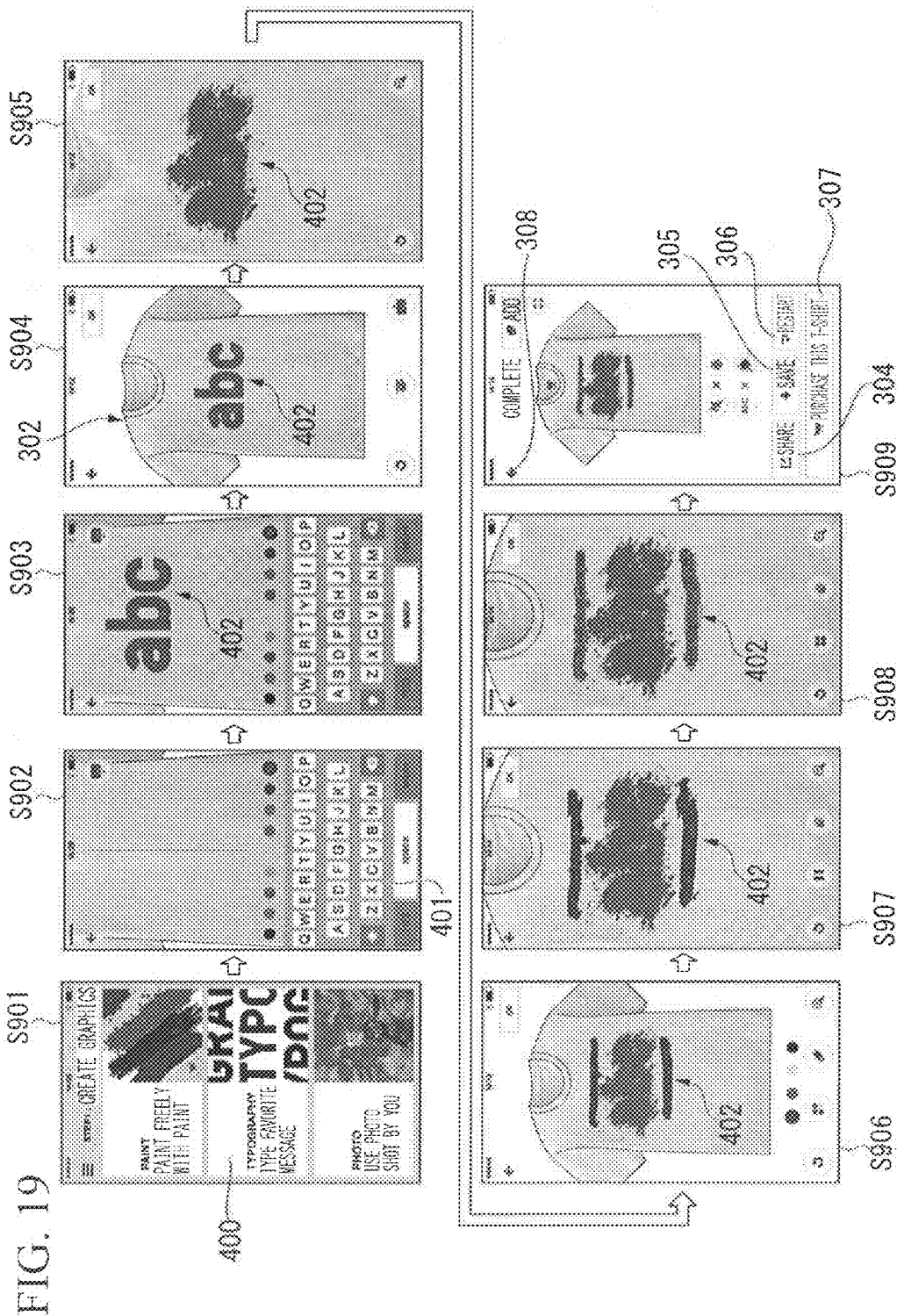
FIG. 19 is a diagram of a letter image including splashed partial image according to the embodiment.

FIG. 19 is a diagram of a letter image including a splashed partial image according to the embodiment. The display unit 56 individually displays images S901 to S909. For example, the display unit 56 may display the respective images in the order of the images S901-S909.

The image S901 is an image which includes an operation key 400. The operation key 400 is an operation key for the user to instruct the control unit 54 to draw the letter image. When an operation signal which shows that the operation key 400 is operated is obtained from the control unit 54, the image S902 is generated. The image S902 is an image including an operation keyboard 401 and the basic image 302. The operation keyboard 401 is a software keyboard of the operation unit 52 for the user to designate the letter image to the control unit 54.

The image S903 is an image which includes the additional image 100 as the letter image designated by the user. The image processing unit 55 processes the basic image 302 using the additional image 402. The image processing unit 55 generates the image S903 including the basic image 302 which is processed using the additional image 402. The image processing unit 55 may enlarge the additional image 402 and the basic image 302.

The image processing unit 55 generates the image S904 when it obtains an operation signal showing that the operation key 303 illustrated in FIG. 16 is operated from the control unit 54. An image S904 is an image which includes the basic image 302 which is processed using the additional image 402. When the detection signal is obtained from the control unit 54 the image processing unit 55 splashes the partial image of the additional image 402. The image S905 is an image which includes the basic image 302 which is processed using the additional image 402 in which the partial image is splashed.

When the image processing unit 55 obtains an operation signal showing that the operation key 300 illustrated in FIG. 15 is operated from the control unit 54, it generates the image S906. As shown in the image S907, the image processing unit 55 may expand the additional image 402 and the basic image 302. When the image processing unit 55 obtains the operation signal which shows that the operation signal 310 illustrated in FIG. 18 is operated from the control unit 54, it generates the image S907.

When the image processing unit 55 obtains the detection signal from the control unit 54, it creates a mosaic of the partial image of the additional image 402. The image S908 is an image including the basic image 302 which is processed using the additional image 402 in which the partial image is mosaiced. The image S909 is an image which includes the processed basic image 302, the operation key 304, the operation key 305, the operation key 306, the operation key 307, and the operation key 308, for example.

Figure 20:
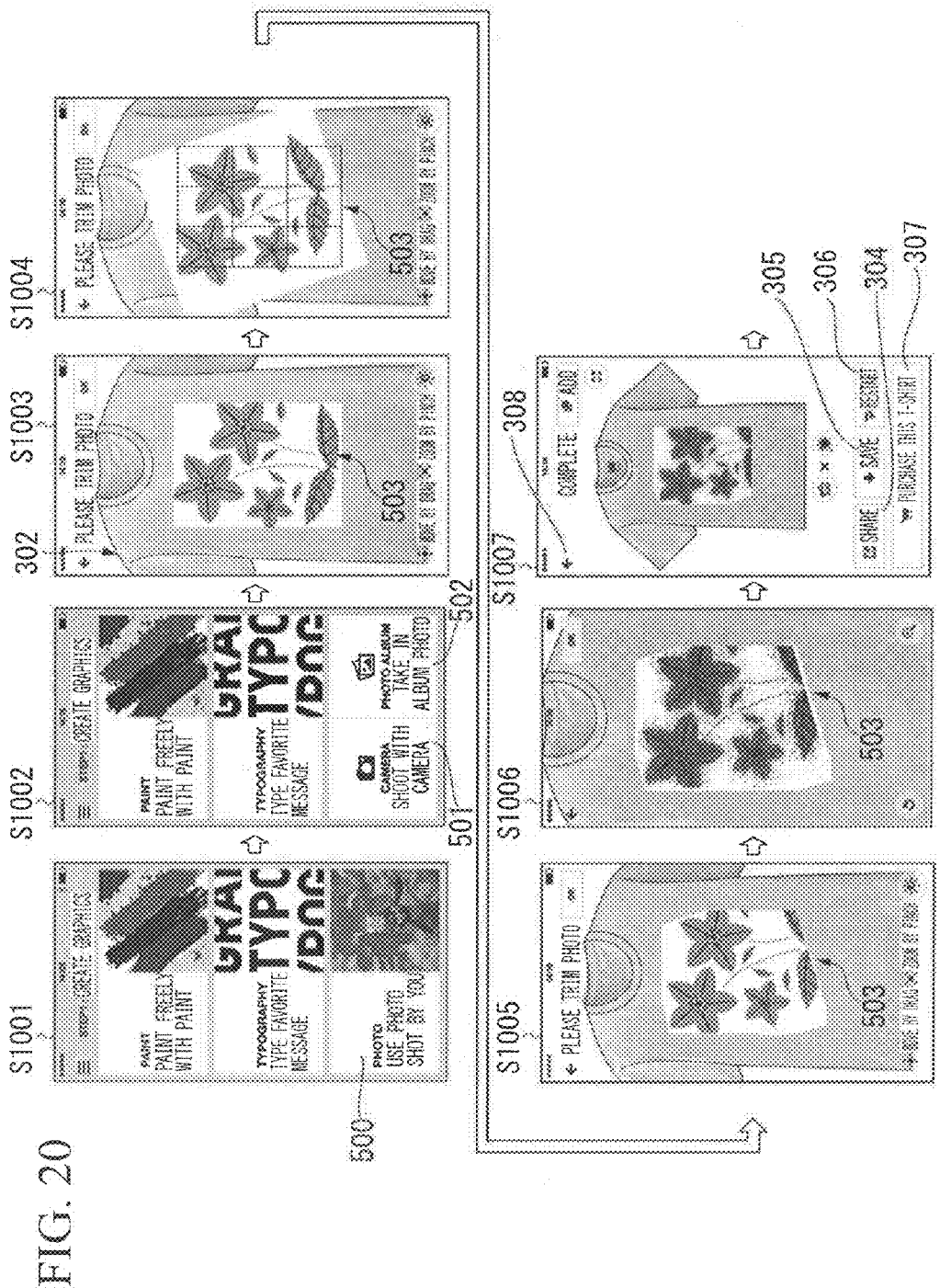
FIG. 20 is a diagram of a selected image including the splashed partial image according to the embodiment.
Figure 21:
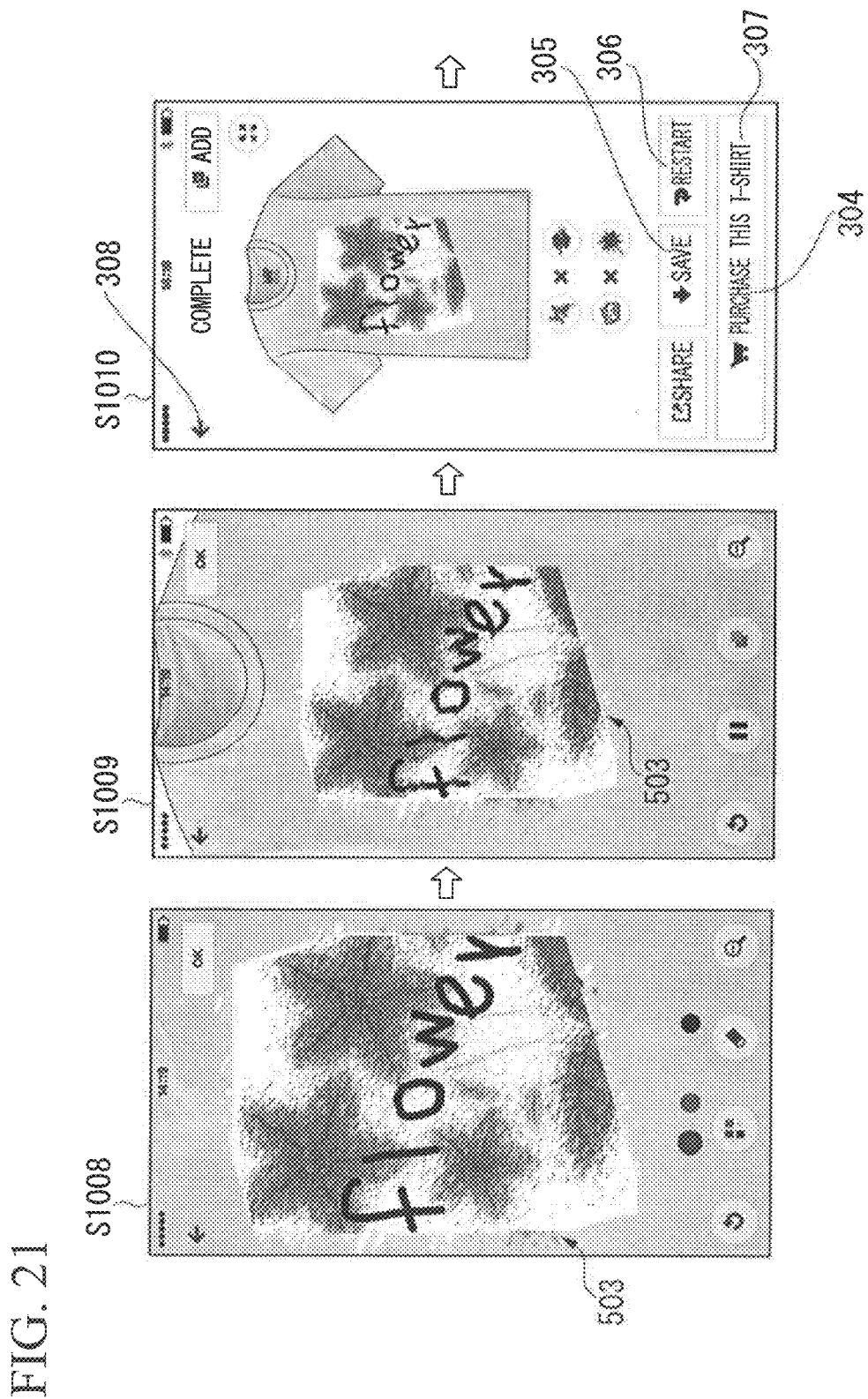
FIG. 21 is a diagram of the selected image including the splashed partial image and a handwritten image including the moved partial image according to the embodiment.
Figure 22:
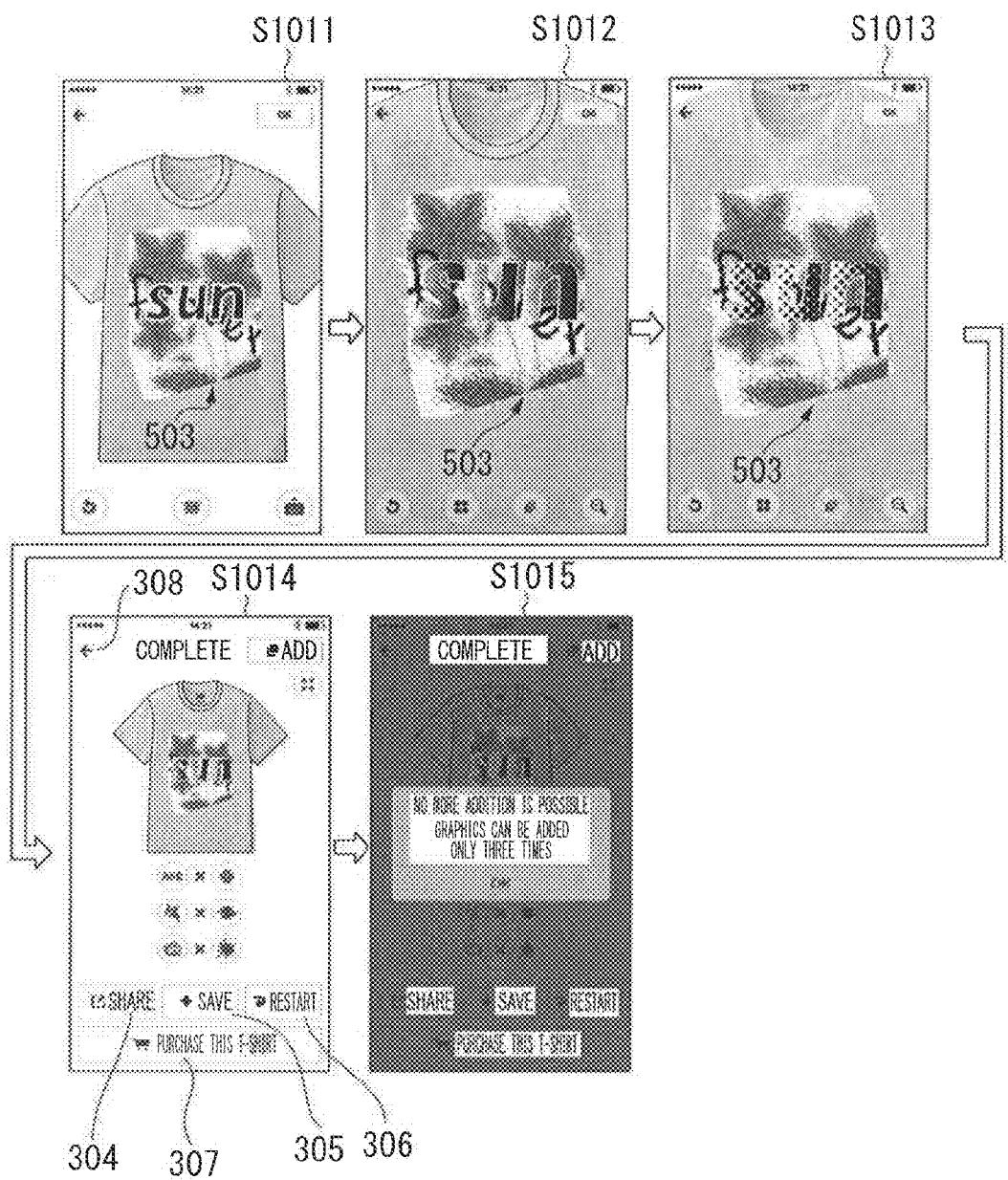
FIG. 22 is a diagram of the selected image including the splashed partial image, the handwritten image including the moved partial image, and the letter image including the mosaiced partial image according to the embodiment.

FIG. 20 is a diagram of a selected image including the splashed partial image according to the embodiment. FIG. 21 is a diagram of the selected image including the splashed partial image and a handwritten image including the moved partial image according to the embodiment. FIG. 22 is a diagram of the selected image including the splashed partial image, the handwritten image including the moved partial image, and the letter image including the mosaiced partial image according to the embodiment.

The display unit 56 individually displays images S1001 to images S1005. For example, the display unit 56 displays the respective images in the order of the images S1001 to the images S1015.

The image S1001 is an image including an operation key 500. The operation key 500 is an operation key for the user to select the selected image such as a PHOTO to designate the selected result to the control unit 54. When the image processing unit 55 obtains an operation signal showing that the operation key 400 is operated from the control unit 54, it generates the image S1002. The image S1002 is an image which includes an operation key 501 and an operation key 502. The operation key 501 is an operation key for instructing the control unit 54 that the user shoots. The image shot by the user is used as a selected image. The operation key 502 is an operation key for instructing the control unit 54 that the user selects the selected image. The selected image is stored in the storage unit 51, for example.

The image S1003 is an image which includes the basic image 302 processed using an additional image 503. When the image processing unit 55 obtains an operation signal from the control unit 54, it may tilt the partial image of the additional image 503 relative to the basic image 302. When the image processing unit 55 obtains the operation signal from the control unit 54, the additional image 503 may be trimmed. The image S1004 is an image including the basic image 302 processed using the tilted additional image 503.

The image S1005 is an image including the basic image 302 processed using the additional image 503. When the image processing unit 55 obtains a detected signal from the control unit 54, it splashes the partial image of the additional image 503. The image S1006 is an image including the basic image 302 processed using the additional image 503 in which the partial image is splashed. The image S1007 is an image including the processed basic image 302, the operation key 304, the operation key 305, the operation key 306, the operation key 307, and the operation key 308, for example.

The image S1008 is an image including the basic image 302 processed using the additional image 503. When the image processing unit 55 obtains a detected signal from the control unit 54, it moves the partial image of the additional image 503 as a handwritten image. The image S1009 is an image including the basic image 302 processed using the additional image 503 in which the partial image is moved. The image S1010 is an image including the processed basic image 302, the operation key 304, the operation key 305, the operation key 306, the operation key 307, and the operation key 308, for example.

The image S1011 is an image including the basic image 302 processed using the additional image 503. When the image processing unit 55 obtains a detected signal from the control unit 54, it creates a mosaic of the partial image of the additional image 503 as a letter image. The image S1012 is an image including the basic image 302 processed using the additional image 503 in which the partial image is mosaiced.

When the image processing unit 55 obtains the detected signal from the control unit 54, the partial image of the additional image 503 as the letter image is further mosaiced. The image S1013 is an image including the basic image 302 processed using the additional image 503 in which the partial image is further mosaiced. The image S1014 is an image including the processed basic image 302, the operation key 304, the operation key 305, the operation key 306, the operation key 307, and the operation key 308, for example.

When the control unit 54 receives an operation signal for adding an additional image at least the predetermined number of times, it causes the image processing unit 55 to generate the image S1015. The image S1015 is an image which shows that graphics can no longer be added. For example, the image S1015 is an image including an image of a character string that "no more addition is possible; graphics can be added only up to three times".

As described above, the image processing program according to an embodiment causes a computer such as an image processing terminal 50, etc., to execute a procedure for obtaining a basic image 302 (a first image); a procedure for obtaining an additional image 100 (a second image); a procedure for changing at least a part of the additional image 100 in accordance with a detection signal or an operation signal; and a procedure for processing the basic image 302 using the changed additional image 100.

In this way, the image processing program may easily process an image. In other words, the image processing program may easily design the image.

In the image processing program according to the embodiment, the additional image 100 is at least one of a handwritten image, a letter image, and a selected image. The signal is used in a process which splashes the additional image 100 in a procedure which changes at least a part of the additional image 100.

In this way, the image processing program may easily process an image using an image, at least a part of which is splashed (a splash image).

In the image processing program according to the embodiment, the additional image 100 is at least one of a handwritten image, a letter image, and a selected image. The signal is used in a process which moves the additional image 100 in a procedure which changes at least a part of the additional image 100.

In this way, the image processing program according to the embodiment may easily process an image using an image, at least a part of which is moved (a glitch image).

In the image processing program according to the embodiment, the additional image 100 is at least one of a handwritten image, a letter image, and a selected image. The signal is used in a process which creates a mosaic of the additional image 100 in a procedure which changes at least a part of the additional image 100.

In this way, the image processing program according to the embodiment may easily process an image using an image, at least a part of which is mosaiced (a mosaic image).

In the image processing program according to the embodiment, the processed basic image 302 is transmitted to the server apparatus 10. The server apparatus 10 transmits the processed basic image 302 to the information terminal 40 and receives information from the information terminal 40.

In the image processing program according to the embodiment, the processed basic image 302 is transmitted to the server apparatus 10. The server apparatus 10 executes at least one of processes of order receipt, production, delivery, and charging of a product based on the processed basic image 302.

In the image processing program according to the embodiment, a detection signal is a detection signal in accordance with at least one of a movement speed, the number of times of movement, and an acceleration vector 200 of the image processing terminal 50. The detection signal is a detection signal in accordance with at least one of the movement speed, the number of times of movement, and the acceleration in response to vibrations provided to the image processing terminal 50, for example. The detection signal may be a detection signal in accordance with at least one of the movement speed, the number of times of movement, and the acceleration of the image processing terminal 50 swung, for example.

The image processing terminal 50 according to the embodiment includes the image processing unit 55 which obtains the basic image 302 (first image), the additional image 100 (second image), and a detection signal, etc., changes at least a part of the additional image 100 in accordance with the detection signal, etc., and uses the changed additional image 100 to process the basic image 302.

This makes it possible for the image processing terminal 50 of the embodiment to easily process an image.

In the image processing terminal 50 according to the embodiment, the additional image 100 is at least one of a handwritten image, a letter image, and a selected image. A detection signal, etc., is used in a process of splashing the additional image 100 in a procedure for changing at least a part of the additional image 100.

In the image processing terminal 50 according to the embodiment, the additional image 100 is at least one of the handwritten image, the letter image, and the selected image. The detection signal, etc., is used in a process of moving the additional image 100 in the procedure for changing at least the part of the additional image 100.

In the image processing terminal 50 according to the embodiment, the additional image 100 is at least one of the handwritten image, the letter image, and the selected image. The detection signal, etc., is used in a process of creating a mosaic of the additional image 100 in the procedure for changing at least the part of the additional image 100.

In the image processing terminal 50 according to the embodiment, the processed basic image 302 is transmitted to the server apparatus 10. The server apparatus 10 transmits the processed basic image 302 to the information terminal 40 and receives information from a terminal.

In the image processing terminal 50 according to the embodiment, the processed basic image 302 is transmitted to the server apparatus 10. The server apparatus 10 executes at least one of processes of order receipt, production, delivery, and charging of a product based on the processed basic image 302.

In the image processing terminal 50 according to the embodiment, a detection signal is a detection signal in accordance with at least one of a movement speed, the number of times of movement, and acceleration of the image processing terminal 50. The detection signal is a detection signal in accordance with at least one of the movement speed, the number of times of movement, and the acceleration in response to vibrations provided to the image processing terminal 50, for example. The detection signal, for example, may be a detection signal in accordance with at least one of the movement speed, the number of times of movement, and the acceleration of the image processing terminal 50 swung, for example.

The image processing system 1 according to an embodiment includes the image processing terminal 50 and the server apparatus 10. The image processing terminal 50 obtains a basic image 302 (first image), an additional image 100 (second image), a detection signal, etc., changes at least a part of the additional image 100 in accordance with the detection signal, etc., and processes the basic image 302 using the changed additional image 100. The server apparatus 10 transmits the processed basic image 302 to a different terminal and receives information from the information terminal 40.

The information from the information terminal 40 is information showing results of a popularity vote for the processed basic image 302, for example.

This makes it possible for the image processing system 1 according to the embodiment to easily process an image.

The image processing method according to an embodiment is an image processing method in the image processing terminal 50, the method including the steps of: obtaining the basic image 302 (first image); obtaining the additional image 100 (second image); changing at least a part of the additional image 100 in accordance with a detection signal, etc.; and processing the basic image 302 using the changed additional image 100.

This makes it possible for the image processing method according to the embodiment to easily process the basic image 302.

While the foregoing described in detail the embodiment of the present invention with reference to the drawings, the specific configuration is not limited to this embodiment, so that a design within a scope which does not depart from the gist of the present invention, etc., is also included.

For example, at least a part of the image processing system 1 according to the embodiment may be configured with a cloud server apparatus. In other words, at least a part of the process executed by the image processing system of the embodiment may be executed with cloud computing.

In other words, the server apparatus 10 and the server apparatus 30 according to the embodiment may be a cloud server apparatus. The storage unit 11 according to the embodiment may store thereon various data sets with the cloud computing. The storage unit 11 according to the embodiment may store thereon various data sets with a key value store, for example. In the image processing terminal 50 according to the embodiment, a web browser may operate.

The cloud computing may include a process by an application (software) provided by SaaS (Software as a Service). The cloud computing may include a process by a platform provided by PaaS (Platform as a Service). The cloud computing may include a process by a resource (public cloud) such as a server apparatus, a central processing unit, and a storage, etc., that are provided by IaaS (infrastructure as a Service). The cloud computing may include a process by a remote operation via the Internet.

In the image processing system 1 according to the embodiment, at least one of monitoring, failure response, and operation thereof may be performed by a proxy service. In the image processing system 1 according to the embodiment, the monitoring, failure response, and operation thereof may be performed by multiple entities.

Programs for implementing the above-described image processing terminals 50 and the server apparatus 10 may be recorded in a computer-readable recording medium to read the programs recorded in this recording medium into a computer system and cause the computer system to execute the programs to perform an execution process. A so-called "computer system" may include hardware such as an OS, a peripheral equipment unit, etc.

Moreover, the "computer system" is also to include a website provision environment (or display environment) if it uses a www system. Furthermore, "a computer-readable recording medium" refers to a non-volatile memory such as a flexible disk, a magneto-optical disk, a ROM, a flash memory, etc., a portable medium such as a CD-ROM, etc., a recording apparatus such as a hard disk, etc., embedded in the computer system.

Moreover, the "computer-readable recording medium" also refers to what holds thereon programs for a predetermined period, such as a volatile memory (a DRAM (dynamic random access memory), for example) inside a computer system to be a client or a server when programs are transmitted via a communications circuit such as a telephone circuit, a network such as the Internet, etc.

Moreover, the above-described programs may be transmitted from a computer system which stores thereon the programs on a storage apparatus, etc., to a different computer system via a transmission medium or via a transmission wave within a transmission medium. Here, the "transmission medium" which transmits the programs refers to a medium which includes a function of transmitting information, such as the communications circuit (communications line) such as a telephone circuit or a network (communications network) such as the internet, etc.

Moreover, the programs may be for implementing a part of the foregoing functions. Furthermore, they may be those such that the foregoing functions may be implemented by a combination with programs which are already recorded on the computer system, or a so-called difference file (difference programs).

EXPLANATION OF SYMBOLS

1 Image processing system
10 Server apparatus
11 Storage unit
12 Control unit
13 Communications unit
20 Communications circuit
30 Server apparatus
40 Information terminal
50 Image processing terminal
51 Storage unit
52 Operation unit
53 Detection unit
54 Control unit
55 Image processing unit
56 Display unit
57 Communications unit
100 Additional image
101 Partial image
102 Partial image
103 Partial image
104 Partial image 105 Partial image
106 Partial image
107 Partial image
108 Partial image
109 Partial image
110 Partial image
111 Partial image
112 Partial image
113 Partial image
200 Acceleration vector
300 Operation key
301 Operation key
302 Basic image
303 Operation key
304 Operation key
305 Operation key
306 Operation key
307 Operation key
308 Operation key
309 Operation key
310 Operation key
400 Operation key
401 Operation keyboard
402 Additional image
500 Operation key
501 Operation key
502 Operation key
503 Additional image

What is claimed is:

1. A non-transitory computer readable medium that stores an image processing program which comprises instructions to be executed by a computer of an image processing terminal having an operation unit, to perform at least:
obtaining a first image;
obtaining a second image;
detecting a detection signal which represents at least one of a movement speed of the image processing terminal, the number of movements of the image processing terminal, and an acceleration of the image processing terminal;
obtaining an operation signal from the operation unit in response to an operation on the operation unit;
collating a sensitivity with a partial image of the second image, wherein the sensitivity is a value which shows how easy a change is;
determining whether or not the sensitivity, which is collated with the partial image of the second image, is equal to or higher than a threshold which is based on the detection signal;
specifying the partial image of the second image which is collated with the sensitivity equal to or higher than the threshold;
changing the partial image in accordance with a signal; and
processing the first image using the second image changed.

2. The non-transitory computer readable medium as claimed in claim 1, wherein the second image is at least one of a handwritten image, a letter image, and a selected image, and
wherein the signal is used in a process which splashes the second image in the procedure for changing the specified partial image in accordance with the signal.

3. The non-transitory computer readable medium as claimed in claim 1, wherein the second image is at least one of a handwritten image, a letter image, and a selected image, and
wherein the signal is used in a process which moves the second image in the procedure for changing the specified partial image in accordance with the signal.

4. The non-transitory computer readable medium as claimed in claim 1, wherein the second image is at least one of a handwritten image, a letter image, and a selected image, and
wherein the signal is used in a process which creates a mosaic of the second image in the procedure for changing the specified partial image in accordance with the signal.

5. The non-transitory computer readable medium as claimed in claim 1, wherein the processed first image is transmitted to a server apparatus, and
wherein the server apparatus transmits the processed first image to a different terminal and receives information from the different terminal.

6. The non-transitory computer readable medium as claimed in claim 1, wherein the processed first image is transmitted to a server apparatus, and
wherein the server apparatus executes at least one of processes of order receipt, production, delivery, and charging of a product based on the processed first image.

7. The non-transitory computer readable medium as claimed in claim 1, wherein the signal is a signal in accordance with at least one of a movement speed, the number of times of movement, and acceleration of an own terminal.

8. The non-transitory computer readable medium as claimed in claim 7, wherein the signal is a signal in accordance with at least one of the movement speed, the number of times of movement, and the acceleration in response to vibrations provided to the own terminal.

9. The non-transitory computer readable medium as claimed in claim 1, wherein the image processing program comprises further instructions to be executed by the computer to further perform at least:
specifying a first coordinate in accordance with instructions for splashing, wherein the first coordinate is distanced from the coordinate of the partial image of the second image by a distance which corresponds to a length of an acceleration vector and in a direction of the acceleration vector, wherein the acceleration vector is represented by the detection signal;
generating a first additional partial image on the first coordinate specified, the first additional partial image corresponding to the partial image of the second image;
specifying a second coordinate distanced from the first coordinate of the first additional partial image by the distance which corresponds to the length of the acceleration vector and in the direction of the acceleration vector; and
generating a second additional partial image on the second coordinate specified, the second additional partial image corresponding to the partial image of the second image.

10. The non-transitory computer readable medium as claimed in claim 9, wherein the image processing program comprises further instructions to be executed by the computer to further perform at least:
move the partial image of the second image, in accordance with instructions for moving, by a distance by the distance which corresponds to the length of the acceleration vector and in the direction of the acceleration vector; and mosaicing the partial image of the second image with changing the shape of the partial image into a predefined shape in accordance with instructions for mosaicing.

11. An image processing terminal device comprising:
an operation unit providing a user interface;
a software component comprising an image processing program including instructions;
a hardware processor configured to execute the image processing program and to perform at least:
obtaining a first image;
obtaining a second image;
detecting a detection signal which represents at least one of a movement speed of the image processing terminal, the number of movements of the image processing terminal, an acceleration of the image processing terminal;
obtaining an operation signal from the operation unit in response to an operation on the operation unit;
collating a sensitivity with a partial image of the second image, wherein the sensitivity is a value which shows how easy a change is;
determining whether or not the sensitivity, which is collated with the partial image of the second image, is equal to or higher than a threshold which is based on the detection signal;
specifying the partial image of the second image which is collated with the sensitivity equal to or higher than the threshold;
changing the partial image in accordance with a signal; and
processing the first image using the second image changed.

12. The image processing terminal device as claimed in claim 11, wherein the image processing program comprises further instructions to be executed by the hardware processor to further perform at least:
specifying a first coordinate in accordance with instructions for splashing, wherein the first coordinate is distanced from the coordinate of the partial image of the second image by a distance which corresponds to a length of an acceleration vector and in a direction of the acceleration vector, wherein the acceleration vector is represented by the detection signal;
generating a first additional partial image on the first coordinate specified, the first additional partial image corresponding to the partial image of the second image;
specifying a second coordinate distanced from the first coordinate of the first additional partial image by the distance which corresponds to the length of the acceleration vector and in the direction of the acceleration vector; and
generating a second additional partial image on the second coordinate specified, the second additional partial image corresponding to the partial image of the second image.

13. The image processing terminal device as claimed in claim 12, wherein the image processing program comprises further instructions to be executed by the hardware processor to further perform at least:
moving the partial image of the second image, in accordance with instructions for moving, by a distance by the distance which corresponds to the length of the acceleration vector and in the direction of the acceleration vector; and
mosaicing the partial image of the second image with changing the shape of the partial image into a predefined shape in accordance with instructions for mosaicing.

14. An image processing method comprising:
obtaining a first image;
obtaining a second image;
detecting a detection signal which represents at least one of a movement speed of the image processing terminal, the number of movements of the image processing terminal, an acceleration of the image processing terminal;
obtaining an operation signal from the operation unit in response to an operation on the operation unit;
collating a sensitivity with a partial image of the second image, wherein the sensitivity is a value which shows how easy a change is;
determining whether or not the sensitivity, which is collated with the partial image of the second image, is equal to or higher than a threshold which is based on the detection signal;
specifying the partial image of the second image which is collated with the sensitivity equal to or higher than the threshold;
changing the partial image in accordance with a signal; and
processing the first image using the second image changed.

15. The image processing method as claimed in claim 14, further comprising:
specifying a first coordinate in accordance with instructions for splashing, wherein the first coordinate is distanced from the coordinate of the partial image of the second image by a distance which corresponds to a length of an acceleration vector and in a direction of the acceleration vector, wherein the acceleration vector is represented by the detection signal;
generating a first additional partial image on the first coordinate specified, the first additional partial image corresponding to the partial image of the second image;
specifying a second coordinate distanced from the first coordinate of the first additional partial image by the distance which corresponds to the length of the acceleration vector and in the direction of the acceleration vector; and
generating a second additional partial image on the second coordinate specified, the second additional partial image corresponding to the partial image of the second image.

16. The image processing terminal device as claimed in claim 15, further comprising:
moving the partial image of the second image, in accordance with instructions for moving, by a distance by the distance which corresponds to the length of the acceleration vector and in the direction of the acceleration vector; and
mosaicing the partial image of the second image with changing the shape of the partial image into a predefined shape in accordance with instructions for mosaicing.

* * * * *